(12) United States Patent
Erickson et al.

(10) Patent No.: US 12,122,449 B2
(45) Date of Patent: Oct. 22, 2024

(54) STEER BY WIRE SYSTEM WITH REDUNDANT ANGULAR POSITION SENSING AND AN END-OF-TRAVEL STOP

(71) Applicant: Sensata Technologies, Inc., Attleboro, MA (US)

(72) Inventors: Paul R. Erickson, Prior Lake, MN (US); Benjamin D. Johnson, Brooklyn Park, MN (US); Edmund C. O'Neill, Victoria, MN (US)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 829 days.

(21) Appl. No.: 16/563,321

(22) Filed: Sep. 6, 2019

(65) Prior Publication Data
US 2021/0070361 A1 Mar. 11, 2021

(51) Int. Cl.
*H02K 11/21* (2016.01)
*B62D 5/00* (2006.01)
(Continued)

(52) U.S. Cl.
CPC ......... *B62D 15/0235* (2013.01); *B62D 5/005* (2013.01); *B62D 5/0469* (2013.01);
(Continued)

(58) Field of Classification Search
CPC .. H02P 6/08; H02P 2203/03; H02P 2207/055; H02P 6/16; B62D 5/005;
(Continued)

(56) References Cited

U.S. PATENT DOCUMENTS

| 4,497,503 A | 2/1985 | Irwin | |
|---|---|---|---|
| 4,572,316 A * | 2/1986 | Kanazawa | B62D 7/1536 180/234 |

(Continued)

FOREIGN PATENT DOCUMENTS

| CN | 201677915 U | 12/2010 |
|---|---|---|
| CN | 101959744 B | 1/2013 |

(Continued)

OTHER PUBLICATIONS

DE-202016001685-U1—Machine Translation—Jun. 2016 (Year: 2016).*

(Continued)

*Primary Examiner* — Gabriel Agared
(74) *Attorney, Agent, or Firm* — Mark H. Whittenberger; Holland & Knight LLP

(57) ABSTRACT

A steer-by-wire system comprising a steering wheel for use by an operator and an electric motor assembly coupled to the steering wheel for providing active torque feedback. The electric motor has a rotor mounted for rotation, and a magnet mounted to the rotor for rotation about an axis, wherein the at least one magnet is a permanent magnet with a pole pair. A fixed stator has coils for creating an electric field to act upon the magnet. Electronics are positioned on the axis of the magnet for controlling commutation of the stator coils and generating a primary high resolution angular position signal indicative of movement of the steering wheel by the operator. High resolution on-axis sensors, in communication with the electronics, detect a commutation position between the rotor and the stator and producing first and second continuous angle measurements for the pole pair of the at least one magnet.

5 Claims, 15 Drawing Sheets

(51) Int. Cl.
*B62D 5/04* (2006.01)
*B62D 15/02* (2006.01)
*H02P 6/08* (2016.01)
*H02P 6/16* (2016.01)

(52) U.S. Cl.
CPC .............. *H02P 6/08* (2013.01); *H02P 6/16* (2013.01); *H02P 2203/03* (2013.01); *H02P 2207/055* (2013.01)

(58) Field of Classification Search
CPC .. B62D 5/001; B62D 5/0469; B62D 15/0235; B62D 5/006; B62D 5/046
See application file for complete search history.

(56) References Cited

U.S. PATENT DOCUMENTS

| | | |
|---|---|---|
| 4,771,846 A | 9/1988 | Venable et al. |
| 4,903,936 A | 2/1990 | Kajiwara |
| 5,884,724 A | 3/1999 | Bohner et al. |
| 6,097,286 A | 8/2000 | Discenzo |
| 6,219,604 B1 | 4/2001 | Dilger et al. |
| 6,481,526 B1 | 11/2002 | Millsap et al. |
| 6,578,444 B1 | 6/2003 | Wendelin |
| 6,598,695 B1 | 7/2003 | Menjak et al. |
| 6,625,530 B1 | 9/2003 | Bolourchi |
| 6,688,645 B2 | 2/2004 | Andonian et al. |
| 6,728,615 B1 | 4/2004 | Yao et al. |
| 6,820,713 B2 | 11/2004 | Menjak et al. |
| 6,896,089 B2 | 5/2005 | Mills et al. |
| 6,899,196 B2 | 5/2005 | Husain et al. |
| 6,926,112 B2 | 8/2005 | Husain et al. |
| 7,174,987 B2 | 2/2007 | Husain |
| 7,232,006 B2 | 6/2007 | Dominke et al. |
| 7,325,644 B2 | 2/2008 | Sakai |
| 7,946,195 B2 | 5/2011 | Ito et al. |
| 8,752,664 B2 | 6/2014 | Rombold |
| 9,475,519 B2 | 10/2016 | Nagl et al. |
| 9,662,755 B2 | 5/2017 | Yamanaka |
| 9,919,732 B2 | 3/2018 | Levesque et al. |
| 2003/0128026 A1* | 7/2003 | Lutz ................. G01D 5/145 324/207.2 |
| 2004/0064229 A1 | 4/2004 | Stout et al. |
| 2006/0082362 A1 | 4/2006 | Hino et al. |
| 2010/0332059 A1 | 12/2010 | Lee et al. |
| 2011/0000738 A1* | 1/2011 | Horii ................. B62D 5/0463 180/446 |
| 2013/0087121 A1 | 4/2013 | Hiei et al. |
| 2013/0106340 A1* | 5/2013 | Chabaud ............. H02P 6/16 318/806 |
| 2013/0190988 A1 | 7/2013 | Limpibunterng et al. |
| 2014/0203746 A1 | 7/2014 | Linder |
| 2017/0320515 A1* | 11/2017 | Levesque .......... B62D 5/006 |
| 2017/0361867 A1* | 12/2017 | Lewis ............... B62D 5/006 |
| 2018/0215456 A1 | 8/2018 | Ozaki |
| 2019/0047619 A1 | 2/2019 | Tth et al. |
| 2019/0311570 A1* | 10/2019 | Lamb ................ G07F 17/34 |
| 2019/0334460 A1 | 10/2019 | Phan et al. |
| 2019/0375451 A1* | 12/2019 | Badiru ............... B62D 6/002 |

FOREIGN PATENT DOCUMENTS

| | | | |
|---|---|---|---|
| CN | 104085442 A | 10/2014 | |
| CN | 203876812 U | 10/2014 | |
| CN | 204020971 U | 12/2014 | |
| CN | 106275058 A | 1/2017 | |
| CN | 108028589 A | 5/2018 | |
| CN | 108698640 A | 10/2018 | |
| CN | 114901539 A | 8/2022 | |
| DE | 19834868 A1 | 2/2000 | |
| DE | 10046167 A1 | 5/2001 | |
| DE | 10305132 A1 | 11/2004 | |
| DE | 10 2010 029 332 A1 | 12/2011 | |
| DE | 102013014133 B3 | 10/2014 | |
| DE | 102013014137 B3 | 10/2014 | |
| DE | 102013014138 B3 | 12/2014 | |
| DE | 102013214417 A1 | 1/2015 | |
| DE | 202016001685 U1 * | 8/2016 | |
| EP | 1731403 B1 * | 8/2010 | ............. B62D 1/163 |
| EP | 2840012 A1 | 12/2016 | |
| JP | 2004330840 A | 11/2004 | |
| JP | 2006282133 A | 10/2006 | |
| JP | 2010173592 A | 8/2010 | |
| JP | 2011020489 A * | 2/2011 | ............. B62D 5/008 |
| JP | 2012006487 A | 1/2012 | |
| JP | 2012091677 A | 5/2012 | |
| KR | 10-2004-0041967 A | 5/2004 | |
| KR | 10-2005-0060875 A | 6/2005 | |
| KR | 20070104054 A | 10/2007 | |
| KR | 20080004177 A | 1/2008 | |
| KR | 20090007105 A | 1/2009 | |
| KR | 20090007992 A | 1/2009 | |
| WO | 2009110665 A1 | 9/2009 | |
| WO | 2010064825 A2 | 6/2010 | |
| WO | 2017182502 A1 | 10/2017 | |
| WO | WO-2018233846 A1 * | 12/2018 | ......... B62D 15/0245 |

OTHER PUBLICATIONS

Hill, S.G. et al.; Army Research Laboratory; "The Use of a Steering Shaping Function to Improve Human Performance in By-Wire Vehicles"; Publication No. ARL-TR-4387; Mar. 2008, 34 pages.
European and Supplementary Search Report issued in Application Serial No. 20859845.8 PCT/US2020054932 on Apr. 21, 2023.
Supplementary European Search Report and Communication pursuant to Rules 70(2) and 70a(2) EPC issued in Application Serial No. 20859845.8 PCT/US2020054932 on May 10, 2023.
International Search Report and Written Opinion issued in PCT/US2020/54932, dated Mar. 23, 2021.
Office Action cited in related Chinese Application Serial No. 202080076959.7 dated Feb. 3, 2024.
Notice of Allowance issued in related Chinese Application Serial No. 202080076959.7 dated Jul. 19, 2024.

* cited by examiner

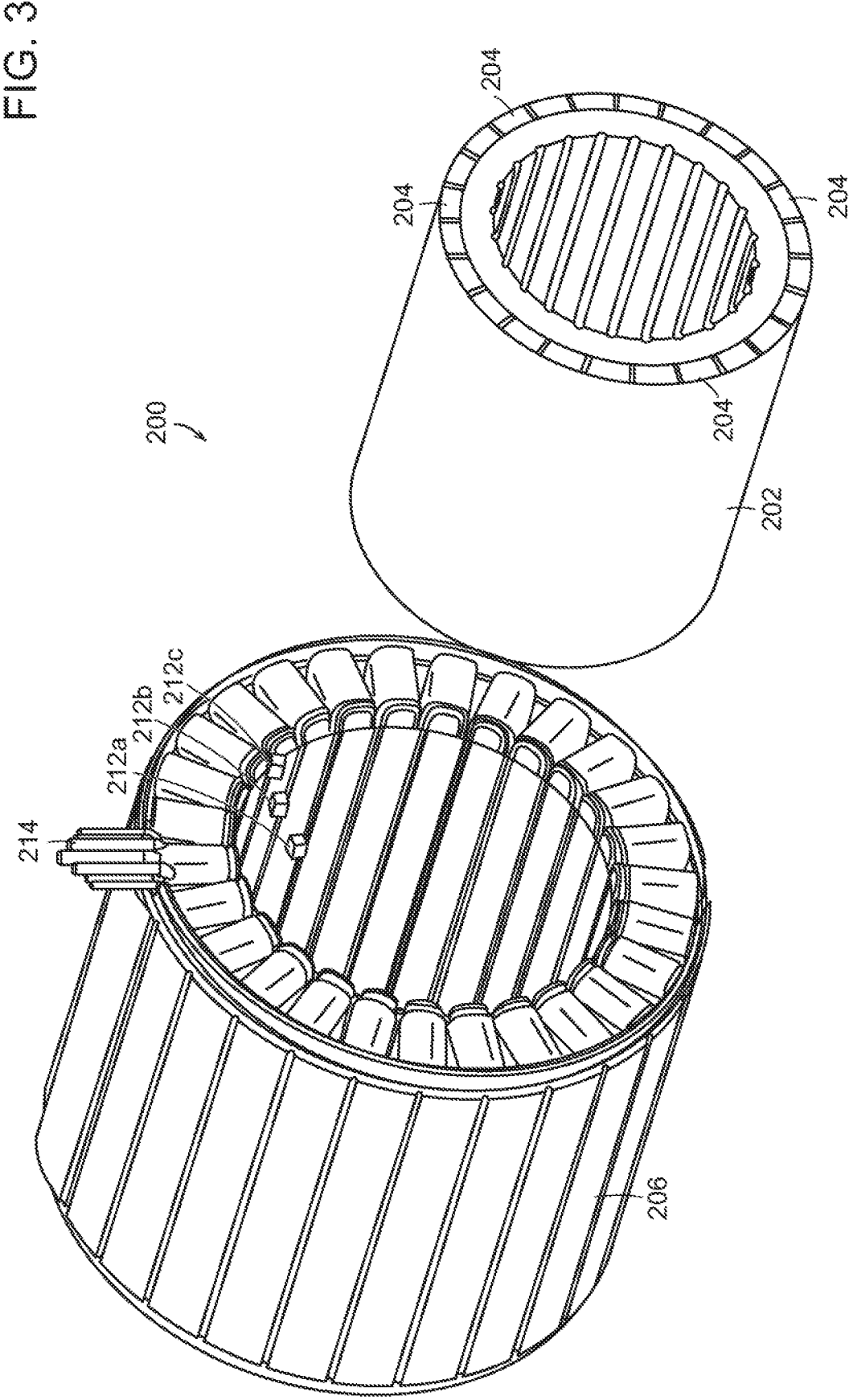

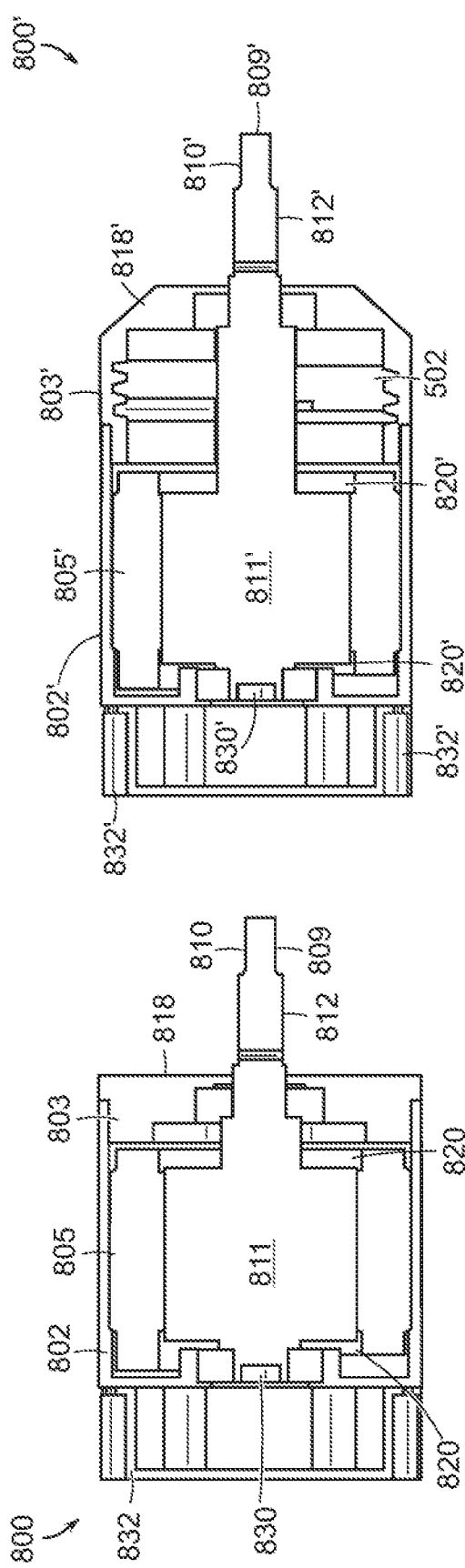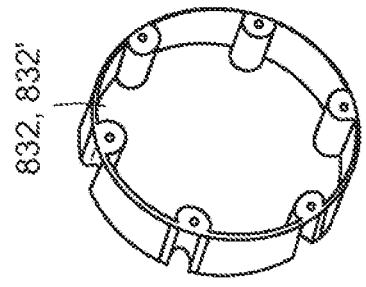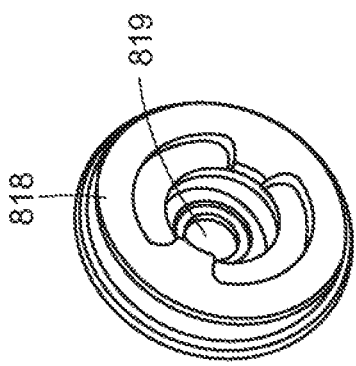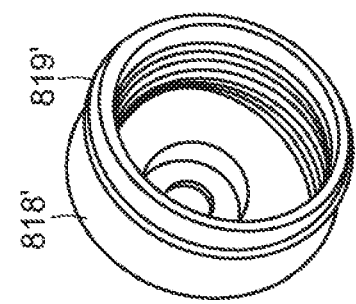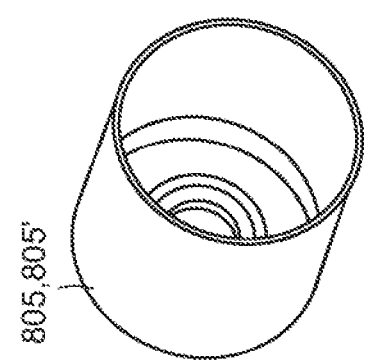

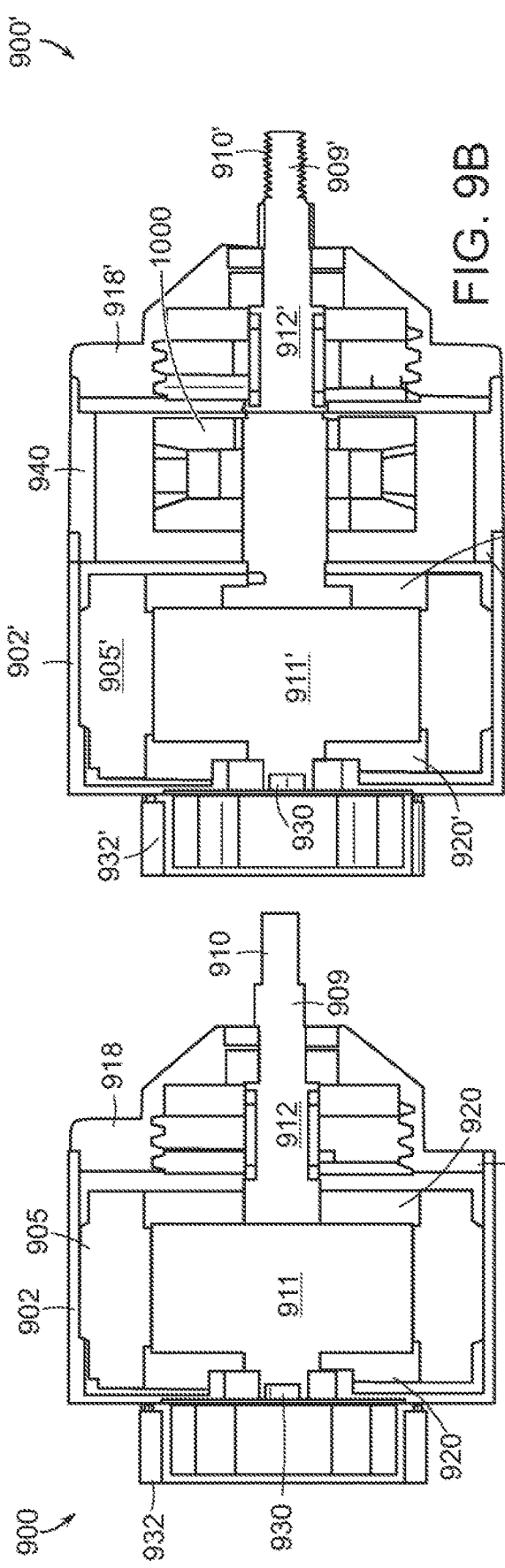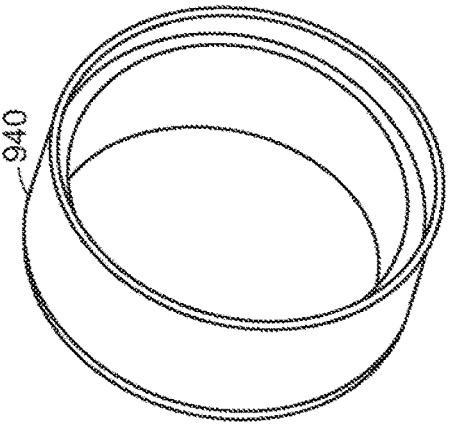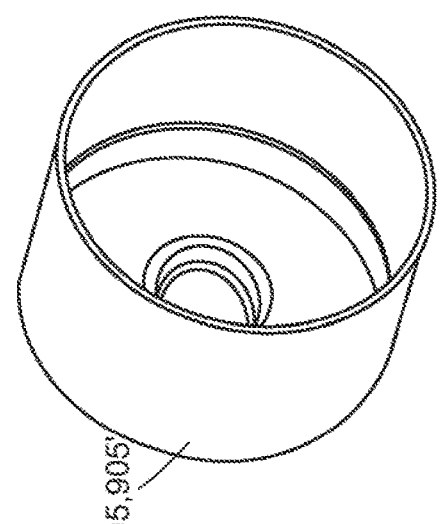

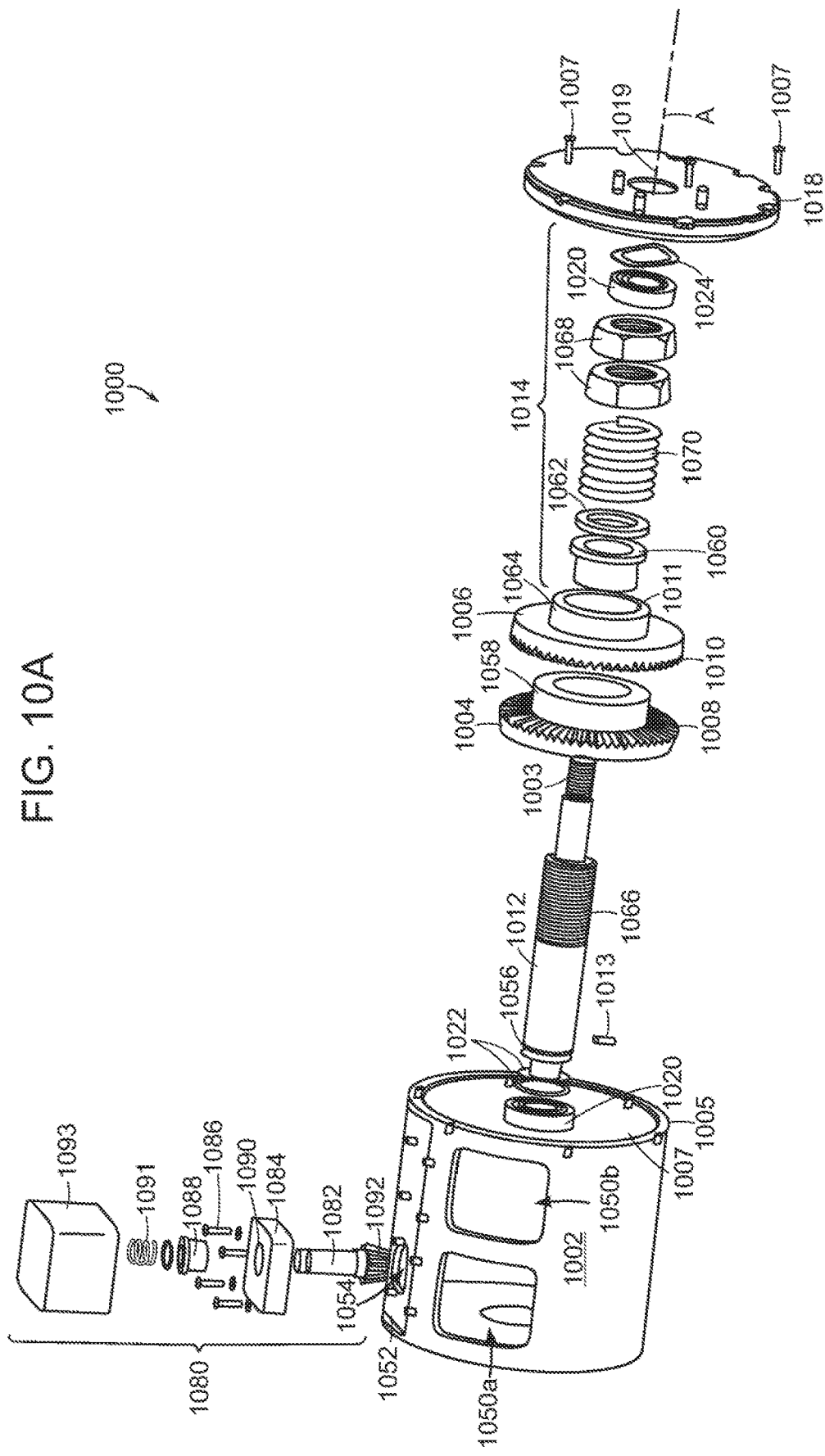

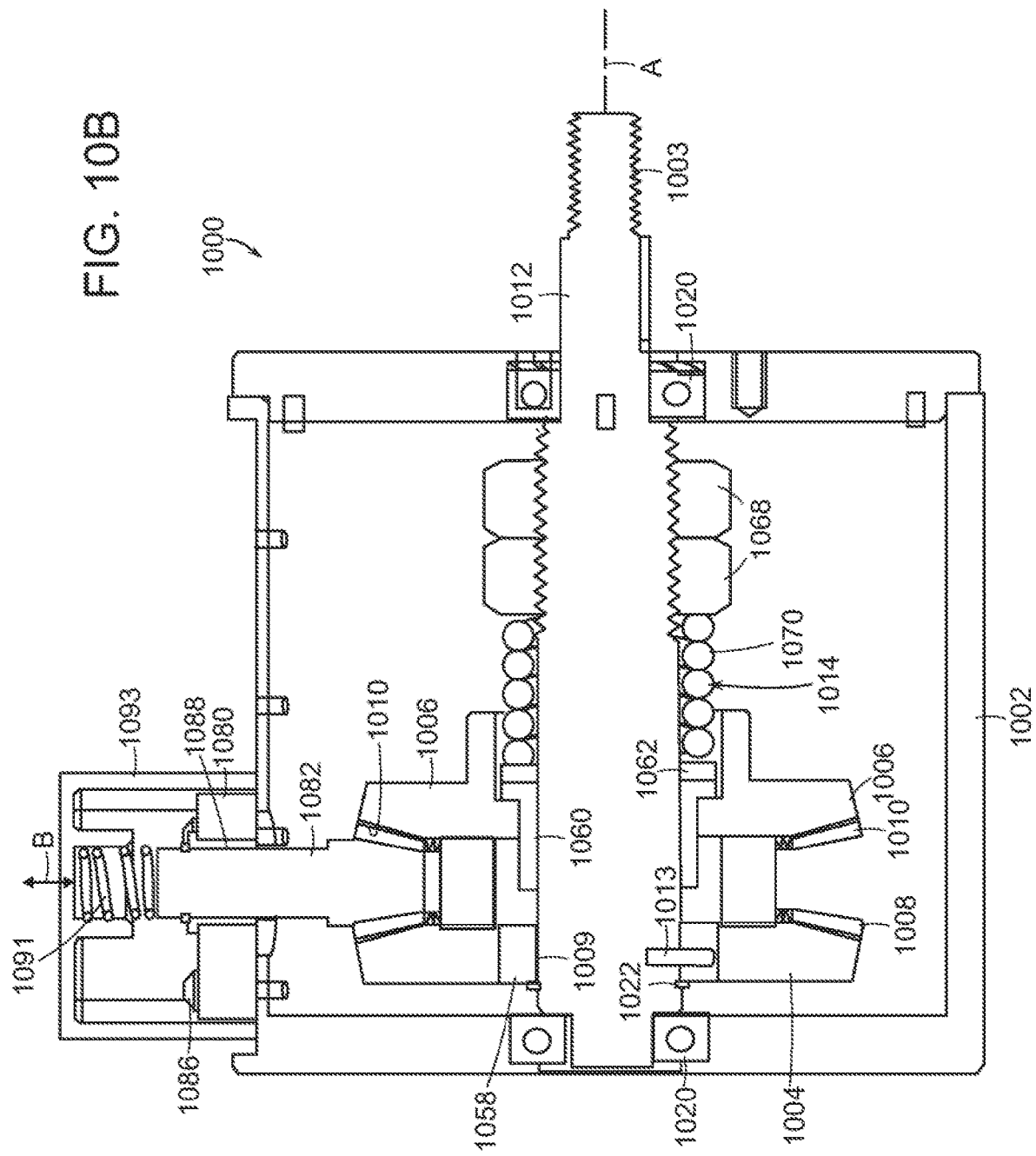

STEER BY WIRE SYSTEM WITH REDUNDANT ANGULAR POSITION SENSING AND AN END-OF-TRAVEL STOP

BACKGROUND OF THE INVENTION

1. Field of the Invention

The subject disclosure relates to steer by wire systems, and more particularly to steer by wire systems with redundant angular position sensing, selectable operating modes and an end-of-travel stop.

2. Background of the Related Art

Traditional vehicles are steered by a direct mechanical and/or hydraulic linkage between a steering wheel, steering gears, and the actual wheels. With such systems, the driver turns the steering wheel and, in turn, the steering gears turn the wheels. The feel of the system is created by the mechanical linkage, which may be power assisted. Change in the feel of the system may be an indication of one or more components not functioning properly or being in improper condition such as unbalanced or misaligned wheels.

To provide various advantages, direct mechanical linkages can be replaced with a steer by wire system. In a steer by wire system, a position encoder monitors the position of the steering wheel. The position encoder reading is translated into a desired position of the steering angle. An electric signal is sent to a steering control unit to properly turn the wheels in response to the signals.

Steer by wire systems have great potential in that a number of required mechanical connections and components are eliminated. However, with these systems, the driver is not provided with any feedback of the torque and torque fluctuations occurring in the steering system. Various systems have been developed to provide drivers with the desired feel to the steer by wire systems. For example, see U.S. Pat. No. 6,728,615 to Yao et al. issued on Apr. 27, 2004 and U.S. Pat. No. 6,097,286 to Discenzo issued on Aug. 1, 2000.

Additionally, in conventional steering systems, the physical connection between the steering wheel and road-wheel directing mechanism creates travel limits for the steering wheel when the end of the available range of travel is met. However, in steer-by-wire systems it is necessary to create the end of travel stops for the steering wheel. For example, see U.S. Pat. No. 6,899,196 to Husain et al. issued on May 31, 2005, U.S. Pat. No. 6,481,526 issued to Millsap et al. issued on Nov. 19, 2002, and U.S. Patent Publication No. 2017/0320515 to Levesque et al. published on Nov. 9, 2017. The prior art approaches tend to be costly, consume power, suffer from excessive complexity, jam or are otherwise sub-optimal.

Further, traditional hydraulic and mechanical steering systems are limited to a fixed steer ratio. The steering forces are determined only by the design of the hydraulic and/or mechanical components. Some hydraulic systems have a limited ability to change the steer ratio by switching in additional pumping capacity. However, in the field, these systems have a very limited ability to easily or economically change steering characteristics. Examples of steer ratio modification are shown in U.S. Pat. No. 6,219,604 to Dilger et al. issued on Apr. 17, 2001, U.S. Pat. No. 5,884,724 to Bohner et al. issued on Mar. 23, 1999, and U.S. Patent Publication No. 2004/0064229 to Stout et al. published on Apr. 1, 2004.

In traditional mechanical steering systems, when the vehicle is switched off, the mechanical and/or hydraulic connection provides strong resistance to motion of the steering wheel. However, in steer-by-wire systems, it is desirable to create resistive torque at the operator steering wheel when the vehicle is switched off. For example, see U.S. Pat. No. 8,752,664 to Rombold issued on Jun. 17, 2014, U.S. Pat. No. 7,946,195 to Ito et al. issued on May 24, 2011, and U.S. Pat. No. 7,232,006 to Dominke et al. issued on Jun. 19, 2007.

SUMMARY

In view of the above, a need exists for a system that has active torque feedback with a brushless DC motor as well as provides both motor commutation and sensing operator inputs with redundancy. In one embodiment, the subject technology is directed to a steer by wire system comprising a steering wheel for use by an operator and an electric motor assembly coupled to the steering wheel for providing active torque feedback. The electric motor has a rotor mounted for rotation; at least one magnet mounted to the rotor for rotation about an axis, wherein the at least one magnet is a permanent magnet with a pole pair. A fixed stator has coils for creating an electric field to act upon the least one magnet. A printed circuit board (pcb) is positioned on the axis of the least one magnet for controlling commutation of the stator coils and generating a primary high resolution angular position signal indicative of movement of the steering wheel by the operator. High resolution on-axis sensors, in communication with the pcb, detect a commutation position between the rotor and the stator and producing first and second continuous angle measurements for the pole pair of the at least one magnet. Preferably, the first and second continuous angle measurements have a phase separation so that direction of movement of the at least one magnet is detected and processed by the pcb to determine the primary high resolution angular position signal. The at least one magnet may be magnetized across a diameter thereof so that the primary high resolution angular position signal is an absolute position measurement based upon capturing an actual position at start up from reference to the high resolution on-axis sensors, the actual position being maintained by applying incremental data to the actual position at start up.

Further, a need exists for end-of-travel stops that are mechanically simple and robust that do not consume power.

Another embodiment of the subject technology is directed to a steering control assembly for a steering system having a shaft that rotates about an axis based on rotation of a steering wheel, wherein the shaft has at least one spline. The steering control assembly comprises a housing defining an axial opening with internal threads and mounted about the shaft, the housing having a first landing boss and a second landing boss. A disk has circumferential threads coupled with the internal threads. The disk also defines an axial through hole with a key coupled to the at least one spline of the shaft for rotation with the shaft. The disk also includes opposing first and second faces, wherein a first raised boss is disposed on the first face and a second raised boss is disposed on the second face. Rotation of the shaft in a first direction causes rotational and, and in turn, axial movement of the disk within the housing until the first raised boss contacts the first landing boss to prevent further rotation of the shaft in the first direction (an effective stop). Rotation of the shaft in a second direction causes rotational and, and in turn, opposite axial movement of the disk within the housing until the second raised boss contacts the second landing boss to prevent further rotation of the shaft in the second direction (a second effective stop). The steering control assembly may also include a fixed stator defining an interior, wherein the housing and disk are located in the interior and an end plate coupled to the stator to enclose the interior. The opposing first and second faces can have multiple mounting locations for the first and second raised bosses for adjusting an amount of travel in the first and second directions. The steering control assembly may also include a plurality of blocks for insertion between the first or second landing boss for adjusting an amount of travel in the first or second direction, respectively.

Still further, a need exists for a steer by wire system to have the ability to easily and economically change steering characteristics in the field. In one embodiment, the subject technology is directed to control haptic conditions based on the operating mode specified by the operator or the steering control unit of the vehicle. The signal which initiates the desired mode may originate from a vehicle steering control unit and be communicated by a serial interface, such as Controller Area Networks (CAN) or other interfaces typical of standard vehicle interfaces. The signals may also be communicated by direct input from the operator, such as a button press, trigger pull or other operator input. In one embodiment, the subject technology is directed to a control architecture system for steer by wire system that includes a steering control unit for receiving an input signal indicating a mode of operation of the steer by wire system and generating a control signal based on the input signal and a motor drive module for receiving the control signal and controlling a motor based on the control signal to accomplish operation of the steer by wire system in a selected mode of operation. Preferably, the mode of operation is selected from the group consisting of: "put and hold" mode; "steer to center" mode; and "maintained offset" mode.

Still further it would be desirable to have a modular system that allows for incorporation as well as mixing and matching of the technology described herein without adding to complexity, reducing robustness, or being prohibitively expensive.

One embodiment is directed to a brushless DC motor for providing active torque feedback in a steer by wire system. The system includes a fixed stator and a rotor mounted for rotation with respect to the fixed stator, the rotor having a plurality of magnets and each magnet forming a pole pair. At least two analog magnetic sensors provide a continuous angle measurement signal. A steering control unit receives the continuous angle measurement signal and determining a relative positional measurement of the rotor based on the continuous angle measurement signal. The steering control unit can also determine an absolute measurement of a position of the rotor upon start up and updates the position of the rotor based on the relative positional measurement. Preferably, the at least two analog magnetic sensors provide motor commutation data to the steering control unit so that a phase relationship between the fixed stator and the rotor is determined by the steering control unit. The plurality of magnets can be twenty-four magnets and the at least two analog magnetic sensors can be three analog magnetic sensors 120 electrical degrees out of phase with each other so that the resulting continuous angle measurement signal is a substantially sawtooth waveform resulting in about 589,824 counts/revolution of the rotor.

It is desirable to provide a practical, reliable, fail-safe mechanism to supply torque to hold the steering wheel in a position when the vehicle power is switched off. One embodiment of a power off torque assembly for a steering system includes a shaft that rotates about an axis based on rotation of a steering wheel. First and second bevel gear plates circumferentially mount about the shaft, wherein the first bevel gear is mounted for rotation with the shaft and the second bevel gear rotates freely about the shaft. A biasing assembly couples the first and second bevel gear plates together for rotation about the shaft. A power off brake mechanism has a pinion gear for selective engagement with the first and second bevel gear plates so that when engaged, the first and second bevel gear plates rotate in opposite directions to create a frictional torque on the shaft to oppose rotation thereof.

It should be appreciated that the subject technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed technology appertains will more readily understand how to make and use the same, reference may be had to the following drawings.

FIG. 3 is an exploded view of a brushless DC motor for a steer by wire system in accordance with the subject disclosure.

FIG. 8A is a cross-sectional view of a steering module support assembly in a first configuration accordance with the subject disclosure.

FIG. 8B is a cross-sectional view of the steering module support assembly of FIG. 8A in a second configuration in accordance with the subject disclosure.

FIG. 8C is an isolated perspective view of the housing for the assembly of FIGS. 8A and 8B in accordance with the subject disclosure.

FIG. 8D is an isolated perspective view of the end cap for the assembly of FIG. 8B in accordance with the subject disclosure.

FIG. 8E is an isolated perspective view of the for the end cap assembly of FIG. 8A in accordance with the subject disclosure.

FIG. 8F is an isolated perspective view of the cover for the assembly of FIGS. 8A and 8B in accordance with the subject disclosure.

FIG. 9A is a cross-sectional view of a steering module support assembly in a first configuration in accordance with the subject disclosure.

FIG. 9B is a cross-sectional view of the steering module support assembly of FIG. 9A in a second configuration in accordance with the subject disclosure.

FIG. 9C is an isolated perspective view of the end cap for the assembly of FIGS. 9A and 9B in accordance with the subject disclosure.

FIG. 9D is an isolated perspective view of the housing for the assembly of FIGS. 9A and 9B in accordance with the subject disclosure.

FIG. 9E is an isolated perspective view of the housing extender for the assembly of FIGS. 9A and 9B in accordance with the subject disclosure.

FIG. 10A is an exploded view of a steering assembly having a power off brake mechanism for a steer by wire system in accordance with the subject disclosure.

FIG. 10B is an assembled, cross-sectional view of the steering assembly of FIG. 10A.

DETAILED DESCRIPTION OF PREFERRED EMBODIMENTS

Figure 1:
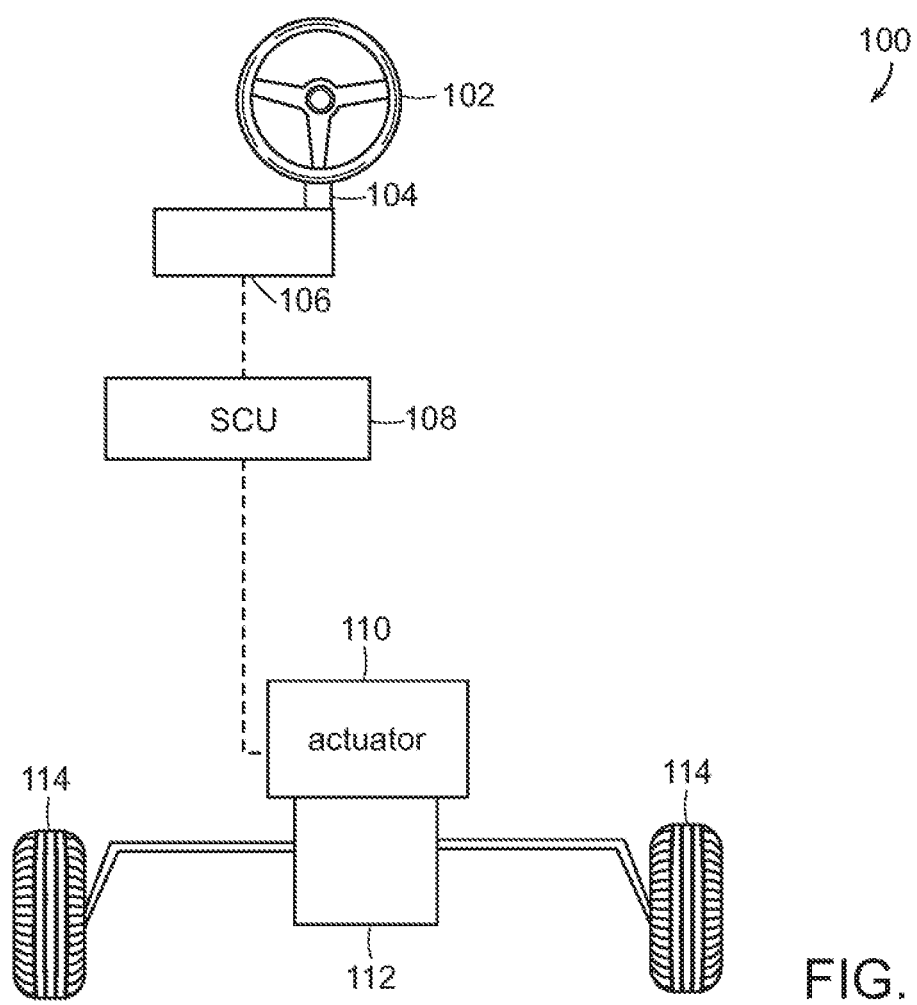
FIG. 1 is a schematic diagram of a steer by wire system in accordance with the subject disclosure.

The subject technology overcomes many of the prior art problems associated with steer by wire systems and methods. The advantages, and other features of the technology disclosed herein, will become more readily apparent to those having ordinary skill in the art from the following detailed description of certain preferred embodiments taken in conjunction with the drawings which set forth representative embodiments of the present technology and wherein like reference numerals identify similar structural elements. Directional indications such as upward, downward, right, left and the like are used with respect to the figures and not meant in a limiting manner.

Referring now to FIG. 1, there is shown a schematic diagram of a steer by wire system 100 in accordance with the subject disclosure. The steer by wire system 100 has an absence of mechanical or hydraulic connection between the operator and the mechanism directing the wheels. The system 100 has a steering wheel 102 for the operator that is connected to a steering column 104. Movement of the column 104 is tracked by an encoder assembly 106 so that a controller or steering control unit (SCU) 108 can translate the movement into an actuator control signal. The actuator control signal is sent to an actuator 110 that drives the desired movement of the steering mechanism 112 so that the wheels 114 turn in the desired manner.

Angular Position Sensor

There is a need for a low cost, redundant, high functional-safety angular position sensing assembly that senses driver input in a steer by wire system such as the system 100 described above. Some features of steer by wire force feedback systems require accurate and noise free approximations of the velocity at which the steering device is being moved by the operator. One method of achieving this is by calculating the time derivative of position in real time. Typically, there are two dominant sources of error in calculating velocity using digital position sensors. The first is quantization error that is caused by collecting too few data samples per sampling time period. The quantization error may be reduced by either increasing the number of data samples by increasing the sampling period or by increasing the resolution of the position measurement. Increasing the sampling time can create a perceptible time delay when this measurement is used to create force feedback to the steer by wire operator control. It is desirable, therefore, that quantization error be reduced by optimizing position resolution, rather than by increasing the sampling period.

Figure 2A:
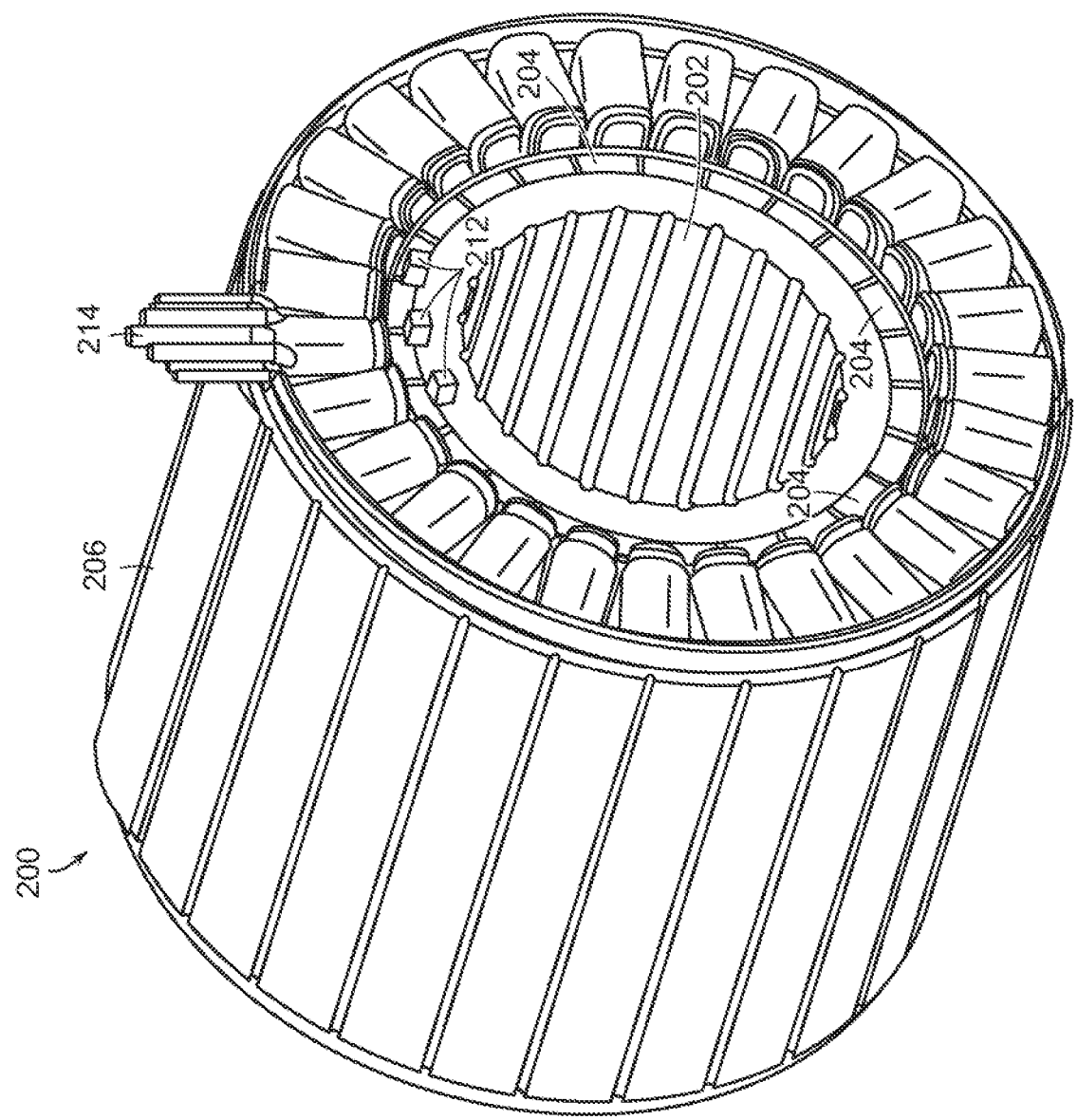
FIG. 2A is a perspective view of a brushless DC motor for a steer by wire system in accordance with the subject disclosure.
Figure 2B:
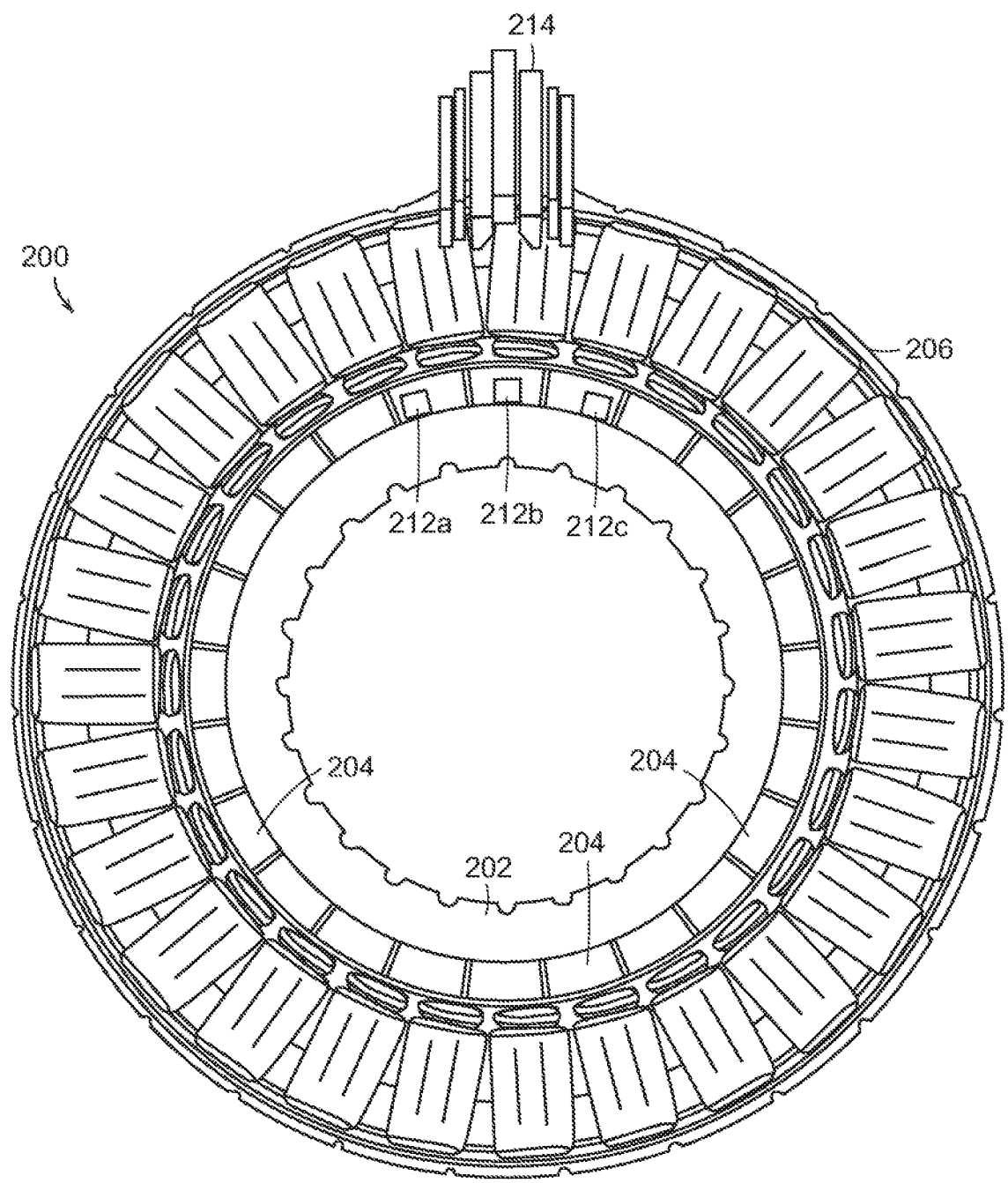
FIG. 2B is a plan view of a brushless DC motor for a steer by wire system in accordance with the subject disclosure.

The second source of error in calculating the operator control input device velocity is signal noise. Signal noise may be reduced by averaging multiple values over a sampling period. However, it is desirable to minimize the time delay caused by a large sampling period. In this disclosure, a sensing assembly that reduces the quantization error by by increasing the resolution of the position measurement is disclosed. An example is shown in FIGS. 2A, 2B and 3, which are described in more detail below. Preferably, the sensing assembly will have one or more angular position sensors for electronically translating the driver intent to vehicle motion. Functional safety practice merits redundancy of the sensing with avoidance of common cause failure. In other words, redundancy with two different sensing technologies is typically more robust than such with a single sensing technology. For example, combinations of optical encoders, Hall effect devices with magnets, and other magnetic devices (e.g., anisotropic magnetoresistance (AMR), giant magnetoresistance (GMR), tunnel magnetoresistance (TMR), colossal magnetoresistance (CMR), extraordinary magnetoresistance (EMR) and the like) may be used for redundancy. Typical low cost sensing methods, such as hall effect, are capable of about 12 bits of resolution over 360 degrees. Higher resolution sensing offers a distinct advantage over traditional hall effect sensors.

Still referring to FIGS. 2A, 2B and 3, various views of a brushless DC (BLDC) motor 200 for a steer by wire system in accordance with the subject disclosure are shown. The electric motor 200 couples into a steer by wire system for providing active torque feedback. The motor 200 includes a rotor 202 with a plurality of magnets 204, each magnet being a permanent magnet with a pole pair. The rotor 202 rotates about a central axis. In the embodiment shown, there are twenty-four magnets 204, each magnet 204 including a pole pair.

A fixed stator 206 surrounds the rotor 202. The stator 206 has coils for creating a magnetic field to drive the magnets 204 and, in turn, move the rotor 202. Electronics (not shown) such as a printed circuit board (pcb) controls the operation of the motor 200. The electronics may be mounted on the central axis or remotely mounted. The electronics send and receive signals for controlling commutation of the stator coils 208 and generating a primary high resolution angular position signal indicative of movement of the steering wheel by the operator. As such, the electronics also generates a signal to control movement of the actuator and thereby the wheels. The electronics are also coupled to three high resolution sensors 212. Wiring 214 provides electrical connection to the stator 206, sensors 212 and other components as needed although some connections may be wireless.

Additionally, continuous angle measurements are processed by the electronics to determine a primary high resolution angular position signal. Although only incremental position movement is determined, absolute position can be determined by referencing the on-axis sensors upon start up and/or upon running a start-up routine. Once absolute position is known, the absolute position is maintained by the electronics using differential data until shutdown. As a result, high functional safety levels are accomplished by eliminating single point magnet failure. Further, separate angle sensing paths with heterogenous redundancy are enabled.

The high resolution sensors 212 also produce first and second continuous angle measurements for each pole pair of the magnets 204. In one embodiment, the first and second continuous angle measurements 402, 404 have a phase separation so that direction of movement of the magnets 204 is detected. At least two sensors 212a-c are needed to determine rotation direction but three or more may be utilized.

Typically, BLDC motors use hall switches for commutation. In this embodiment, the sensing assembly includes three hall effect sensors 212a-c in place of the hall switches. In short, analog sensors are used in place of traditional digital sensors. The hall effect sensors 212a-c are optimally placed to provide sinusoidal wave forms that are spaced by 120 electrical degrees. The hall effect sensors 212a-c are calibrated to output analog voltage over a range of 0 to 5 VDC. The output of each sensor 212a-c is then used as an input to a 12 bit, 0 to 5 VDC analog to digital converter (not shown), which is part of the electronics of the steer by wire system.

Figure 4:
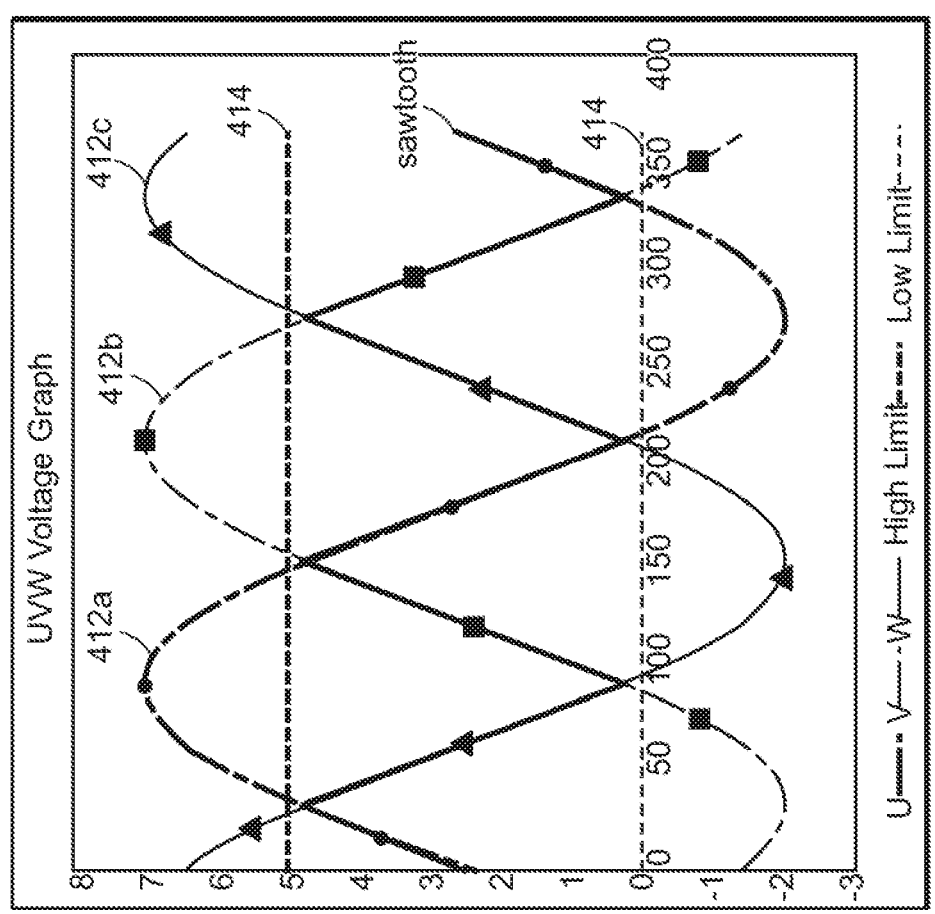
FIG. 4 is a graph of the sensor response for the brushless DC motor of FIG. 3.

Referring now to FIG. 4, a graph 400 of the sensor response for a single magnet passing by the three sensors 212a-c is shown. The graph 400 includes a full sinusoidal signal 412a-c for each sensor 212a-c, respectively. The sinusoidal signals 412a-c captured by the three channels of analog inputs are used in their respective linear ranges between the thresholds 414 of 0V and 5V. As a result, the three linear portions of the signals 412a-c combine to form a zero to five volt sawtooth waveform which is highlighted in FIG. 4. The sawtooth waveform provides an incremental value of rotational position.

As shown in the sawtooth of FIG. 4, the three channels work together to produce six complete sweeps of the 12 bit A/D range for each magnet 204 on the rotor 202 of the BLDC motor 200 with 4096 points per sweep. It is noted that each half of a sawtooth is a sweep through approximately 0.2 to 4.8V. For twenty-four magnets 204, the number of counts is as follows:

(4096 points)(6 sweeps)(24 magnets)=589,824 counts/revolution.

In the case of 12 magnets used on a rotor this results in 12 pole pairs. The resulting resolution is calculated to be 294,912 counts per revolution, which is an improvement of 72 times that of a standard 12 bit hall effect sensor. As can be seen, the 24 magnet embodiment yields a very high resolution.

There are significant advantages to this method of sensing. First, the high resolution allows for a much shorter sampling period for velocity estimation, which yields high accuracy with an extremely low time delay due to sampling. This results in a superior quality of performance for an operator of a steer by wire device. A second significant advantage is the fact that the high resolution sensing method is completely independent of the redundant on-axis sensors used for absolute angle sensing. This is important in achieving the high levels of functional safety necessary for primary steering systems using steer by wire. Another advantage is the high resolution simply helps in overcoming electrical noise that may be present in calculating velocity.

End of Travel Stop

In addition to improved angular position sensing, there is a need for a reliable, low cost mechanism to create end-of-travel stops for greater than one turn lock to lock in a steer by wire system such as the system 100 described above. The mechanism is independent of the type of steering system used in the vehicle. These include, but are not limited to, Ackerman, differential and articulated steering systems. Further, these steering types may include tires, tracks or any other means of guiding a vehicle over the ground or in the water.

Figure 5A:
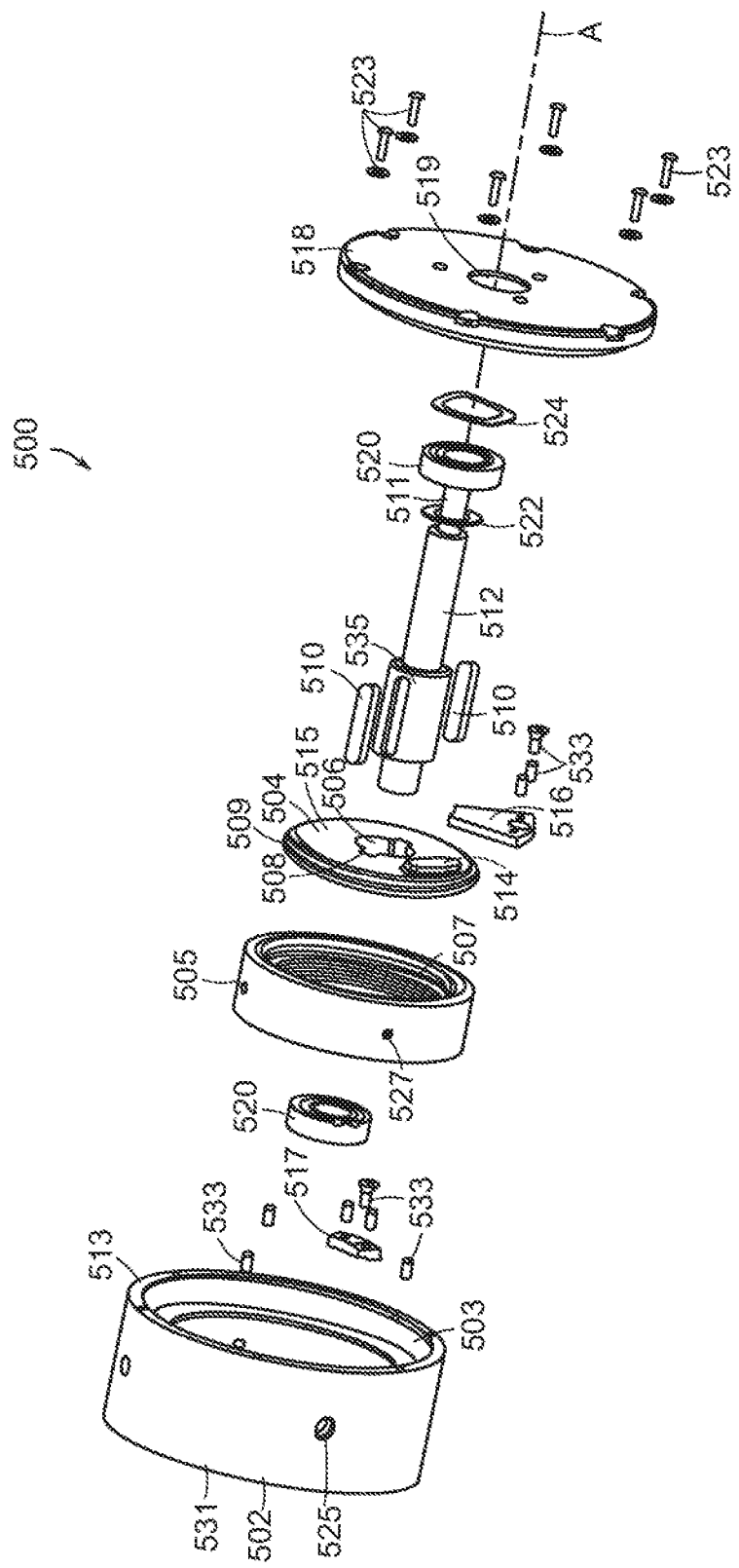
FIG. 5A is an exploded view of a steering control end of travel stop assembly for a steer by wire system in accordance with the subject disclosure.
Figure 5B:
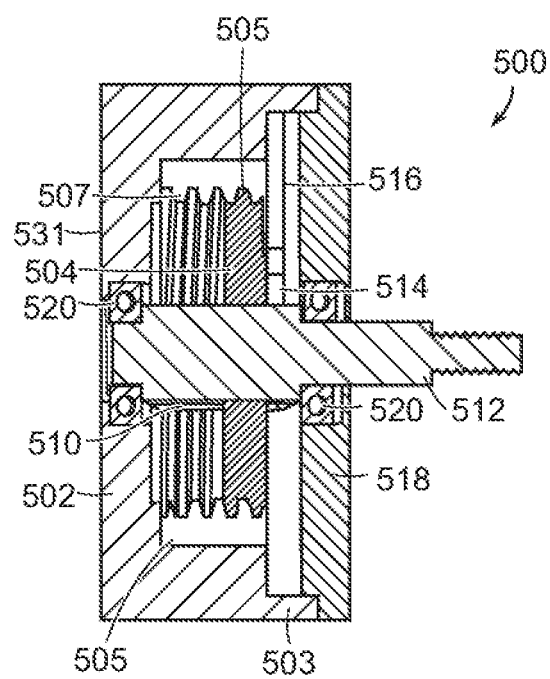
FIG. 5B is an assembled, cross-sectional view of a steering control end of travel stop assembly for a steer by wire system in accordance with the subject disclosure.

Referring now to FIGS. 5A and 5B, an exploded view and an assembled, cross-sectional view, respectively, of a steering control assembly 500 having an end-of-travel stop mechanism for a steer by wire system in accordance with the subject disclosure is shown. The assembly 500 is adapted to selectively inhibit rotation of a steering wheel (not shown) as desired. For example, the control assembly 500 may inhibit or prevent steering wheel rotation at one or more preconfigured stops—e.g., wherein the stops inhibit or prevent additional clockwise or counter-clockwise rotation of the steering wheel, as further described below. In addition, the control assembly 500 also may inhibit steering wheel rotation when the ignition is off. The assembly 500 does not consume any electrical power.

As shown in FIGS. 5A and 5B, the components of the steering control assembly 500 are adapted to be contained within a fixed housing 502 and configured such that a distal end 511 of a steering shaft 512 of the steer by wire system extends from the housing 502. Preferably, the housing 502 is cup-shaped with a substantially or fully closed end 531. The shaft 512 extends along and rotates about an axis A. A distal end 513 of the housing 502 has an internal stepped portion 503 for receipt of a portion of a protective end plate 518. While the end plate 518 substantially encloses the interior of the housing 502, the end plate 518 includes a central hole 519 for the shaft 512 to pass therethrough. The end plate 518 is coupled to the housing 502 with fasteners 523.

The assembly 500 also includes a threaded insert 505 retained within the housing 502. The threaded insert 505 is tubular with internal threads 507. The threaded insert 505 is fixed within the housing 502 such as by one or more fasteners (not shown) passing through bores 525 in the housing 502 into threaded bores 527 in the threaded insert 505. The threaded insert 505 may also be integrally formed with the housing 502.

The assembly 500 also includes a circular disk 504 having circumferential threads 509 which couple with the internal threads 507 of the threaded insert 505. The disk 504 has a central axial through hole 506 with one or more key features 508 to mate with corresponding splines 510 on the shaft 512, such that rotation of the shaft 512 in both a clockwise and counterclockwise direction causes rotation of the disk 504 in a corresponding direction. As shown, the key features 508 are two opposing slots and the splines 510 couple to a collar 535 on the shaft 512. Alternatively, the through hole 506 has one or more spline features to mate with corresponding slots on the shaft 512 to couple the disk 504 and the shaft 512 together.

The circular disk 504 has a distal face 515 with an opposing proximal face (not labeled). A first raised boss 514 is disposed on the distal face 515 and a second raised boss (not explicitly shown) is disposed on the proximal face. The raised bosses 514 interact with landing bosses 516, 517 that are attached to the housing 502. The distal landing boss 516 mounts in the stepped portion 503 to interact with the first raised boss 514 on the distal face 515. The proximal landing boss 517 mounts further inside the housing 502 to interact with the second raised boss on the proximal face of the disk 502. As a result, the rotational travel of the circular disk 504 is limited depending upon how and where the raised bosses 514 and landing bosses 516, 517 are formed and mounted. The landing bosses 516, 517 are particularly easy to move by varying the mounting position and, thus, modify the range of travel.

The assembly 500 also includes two bearings 520 to allow rotation of the disk 504 while still supporting the shaft 512. Washers 522 and sealing rings 524 are adjacent the bearings 520 to reduce friction and provide sealing as needed for particular applications. The assembly 500 may also include one or more fasteners 533 (such as bolts, pins, washers, screws, epoxy, etc.) washers, flanges and the like for assembly of the steering control assembly 500.

Figure 5C:
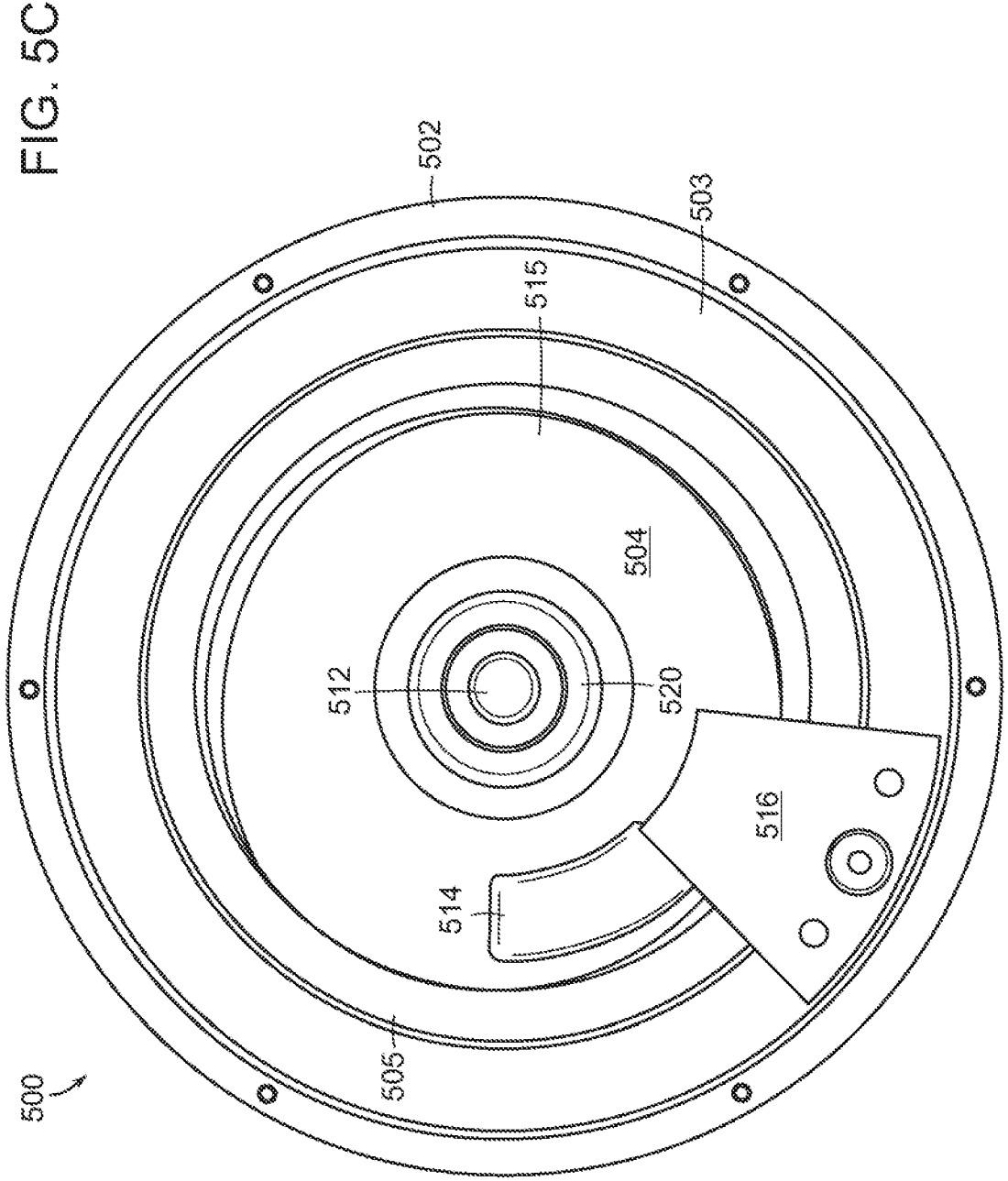
FIG. 5C is plan partially assembled view of a steering control end of travel stop assembly for a steer by wire system in accordance with the subject disclosure.

FIG. 5C illustrates a plan sectional view of the partially assembled steering control end of travel stop assembly 500 in a fully counterclockwise position. As shown in FIG. 5C, the distal raised boss 514 is positioned on the distal face 515 of the disk 504 to bank against the distal landing boss 516. The distal landing boss 516 is attached at a first end 516*a* within the stepped portion 503 of the housing 502 such that a second end 516*b* extends axially inward toward the shaft 512. Similarly, the landing boss 517 may interact with the raised boss on the proximal face to limit clockwise rotation. Alternatively, there are no proximal bosses so that the threaded disk 504 may have been rotated clockwise until the raised boss 514 again banks against the landing boss 516, wherein the full distance between these banked positions being the rotational range of travel. In such an arrangement, the size of the raised boss and landing boss determine the range of travel.

In use, when the shaft 512 is turned by the steering wheel, the disk 504 also turns and travels axially through the housing 505 due to the action of the mating threads 507, 509 of the disk 504 and the housing 505. The number and configuration of the threads 507, 509 is selected to limit the amount of rotation of the steering wheel.

For example, in the counterclockwise rotation direction, once the desired maximum travel of the shaft 512 is reached, the disk 504 has traveled a sufficient axial distance through the housing 505 such that the first raised boss 514 comes into contact with the distal landing boss 516 in the circumferential direction, preventing further turning of the shaft 512, and hence the steering wheel. Advantageously, the assembly 500 of this disclosure is resistant to jamming as a result of the circumferentially directed contact between the first raised boss 514 and the distal landing boss 516. In the clockwise rotation direction, the disk 504 travels axially in a proximal direction so that the second raised boss 521 banks against the proximal landing boss 517 to limit movement of the steering wheel in the clockwise direction.

Notably, the assembly 500 is easily adjustable by adjusting the position of the distal landing boss 516. The housing 502 may have a plurality of mounting holes to accommodate varying the mounting positions of the landing bosses 516, 517. Further, the size and shape of the landing bosses 516, 517 or the raised bosses 514, 521 on the disk 504 may be changed to vary the hard stop positions. Alternatively, one or more blocks may be inserted under the landing bosses 516, 517 or mounted to the raised bosses 514, 521 to further vary the hard stop position. For example, the distal landing boss 516 may be shimmed to extend further distally and shorten the amount of travel a full turn of the disk 502. It is also envisioned that the distal landing boss 516 could be differently mounted, such as on the end plate 518.

In alternative embodiments, raised bosses and landing bosses are not necessary. For example, the number of internal threads or configuration of the housing with endplate limits the amount of travel. For example, a steering control assembly may provide an end of travel stop in a steer by wire system, the steering control assembly comprising: a housing having distal and proximal ends with internal threads between the distal and proximal ends; an elongated shaft extending into the housing and coupled to a steering wheel for rotation therewith; a disk defining circumferential threads coupled with the internal threads and an axial opening for coupling to the shaft for rotation therewith while being free to move axially; and wherein: rotation of the shaft in a first direction causes rotation, and in turn, axial movement of the disk within the housing in a distal direction until the distal end prevents further rotation of the shaft in the first direction; and rotation of the shaft in a second direction causes rotation and, and in turn, axial movement of the disk within the housing in a proximal direction until the proximal end prevents further rotation of the shaft in the second direction. Preferably, an end plate coupled to the cup-shaped housing to enclose an interior of the housing and act as a stop in one direction while the closed cup-shaped end acts as a stop in the other direction. Alternatively, the disk moving to the end of the threads may act as a stop in one or both directions of travel.

Selectable Modes

In addition to a mechanism to create end-of-travel stops, there is a need for additional value added features, such as digital communication and selectable operating modes, in a steer by wire system such as the system 100 described above. The features will work for both steering wheel and joystick applications. These features are independent of the type of steering system used in the vehicle. These include, but are not limited to, Ackerman, differential and articulated steering systems. Further, these steering types may include tires, tracks or any other means of guiding a vehicle over the ground or in the water.

Figure 6:
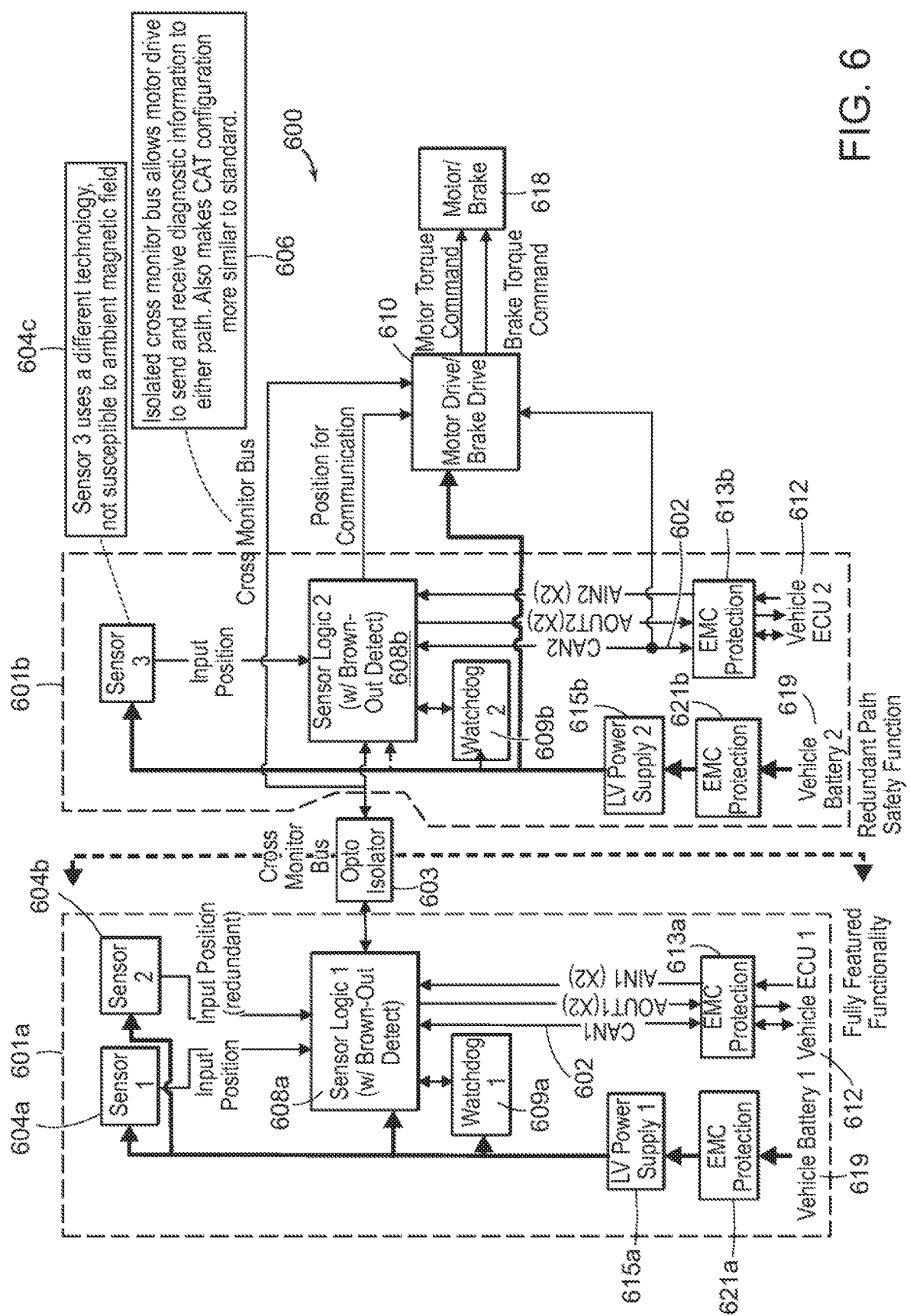
FIG. 6 is a schematic illustration of a control architecture system for a steer by wire system in accordance with the subject disclosure.

Referring now to FIG. 6, a schematic illustration of a control architecture system 600 for a steer by wire system in accordance with the subject disclosure is shown. The system 600 is intended to support the majority of the applications described herein. For safety, the system 600 includes redundant subassemblies 601*a*, 601*b* that are interconnected by an optoisolator 603.

The control architecture system 600 also utilizes a controller area network (CAN) and analog vehicle interfaces and, with minor modifications, supports pulse-width modulation (PWM). The system 600 advantageously provides better robustness against electromagnetic interference (EMI) compared to traditional analog or PWM communication schemes. The system 600 also provides options for diagnostic error messaging. In one aspect of the system 600, a CAN bus is available on the vehicle to allow microcontrollers and devices to communicate with each other without a host computer. The CAN bus provides EMI robustness as well as diagnostic messaging features. As shown in the system 600 in FIG. 6, redundant CAN interfaces 602 are used as the primary communication means.

Each subassembly 601*a*, 601*b* includes sensors 604*a-c* with associated sensor logic modules 608*a*, 608*b*. For safety, each sensor logic module 608*a*, 608*b* has a watchdog 609*a*, 609*b* that is an electronic timer used to detect and recover from computer malfunctions. The sensor logic modules 608*a*, 608*b* communicate with the vehicles electronic control unit 612. Such communication is through a pathway with EMC protection modules 613*a*, 613*b*. The sensors 604*a-c* and associated logic modules 608*a*, 608*b* are powered by a low voltage power supply 615*a*, 615*b*, respectively, that are also connected to the vehicle battery 619 through EMC protection modules 621*a*, 621*b*. The low voltage power supply 615*b* also drives a motor drive module 610 that receives a control signal from the sensor logic module 608*b*. In turn, the motor drive module 610 controls a motor assembly 618. In the embodiment shown in FIG. 6, the motor drive module 610 controls a motor and a brake. As such, motor and torque commands are sent to the motor assembly 618.

In an example of an application of the control architecture system 600, the overall operation is one that allows for selection by the user of a desired operating mode suited for the driving conditions. A switch or selector knob (not shown) allows the user to select between various modes of operation. In addition, modes of operation may be selected by CAN commands over the CAN bus.

In typical agriculture and construction vehicles, the haptic response desired at the control handle is dependent upon the function being done by the vehicle. For example, during road construction operations, the most desirable haptic response may be for the steering control to remain fixed to the most recent operator setting. This mode is referred to as "put and hold". When driving on roads at high speeds, however, the most desirable haptic response has an active "steer to center" force. This steer to center mode gives the operator better control in following a road at high speed. Thus, the system 600 advantageously may incorporate a controller operable at a button (not shown), local to the operator, to switch between "put and hold" and "steer to center" modes according to the function being performed. The haptic function to accomplish the various modes is request transmitted from the vehicle engine control unit 612 over the CAN bus 602. The request is converted into the desired signal to the drive module 610 and, in turn, the motor module 618 creates the desired response.

In another example of an application of the control architecture system 600, while operating a work vehicle (for example, a tractor or combine), it may be desirable to use the steer to center function while experiencing forces trying to turn the vehicle. For example, driving a tractor on the side of a hill tends to induce a turn downhill unless the operator biases the wheels into the hill. With standard steer to center haptics, the operator must maintain constant force on the steering handle to maintain this bias. Thus, the system 600 incorporates a controller operable at a button, local to the operator, to offset the steering center location to maintain the steering bias until the button is pushed again. In this "maintained offset" mode, the operator finds the preferred steering bias, pushes the center offset, and the forces on the handle are eliminated while maintaining the desired path over the ground.

In one embodiment, it is envisioned that a signal generated by the operator steering input angle sensors 604*a-c* is mathematically transformed before being output to the vehicle steering mechanism control components 604, 608, 610, 618. A vehicle steering mode selection switch linked to the mathematical transform function can be used by the operator to select various vehicle steering characteristics as described above. Thus, the operator can choose between a finite number of pre-set steering behaviors. In addition, the isolated cross monitor bus 606 allows the motor drive module 610 to send and receive diagnostic information to either path.

Response Tuning

In addition to value-added digital communication and selectable operating modes, there is a need for an optimal steering ratio function for the steering response in a steer by wire system such as the system 100 described above. One of the advantages offered by steer by wire systems is a reduction in total angular movement of the steering input device. When operating a work vehicle, such as is used for construction or agricultural operations, it is desirable to reduce the total travel of the operator control in order to reduce operator fatigue and improve work cycle efficiency. Reduced total operator input travel can result in excessive steering sensitivity, especially at high speeds. In the construction equipment industry, as well as agricultural, automotive and many other industries that incorporate steering, the term steer ratio is used.

The steer ratio is determined by dividing the operator input travel ($\theta$) by the total allowable articulation angel of the steering system ($\phi_{max}$). Steering systems, such as fully hydraulic systems, typically have a fixed steer ratio that provides acceptable controllability at high speed. Work vehicles, however, operate mostly at low speed. The high steer ratio that provides safe handling at high speed may require excessive operator control movement during the majority of working time.

Steer by wire systems may incorporate methods of variable steer ratio steering because there is no direct link between the operator input control and the steering mechanism. This embodiment utilizes a method of vehicle velocity (V) based steer ratio compensation. The steer ratio is modified in real time based on stored values for the vehicle for which it is intended to be used. These stored values include the wheel base and vehicle track dimensions as well as the maximum desired radial acceleration $A_r$. During operation, the controllers (e.g., 608*a* and 608*b* of FIG. 6), calculate the minimum allowable turn radius ($R_{min}$) to satisfy the maximum allowable $A_r$ using the following equation:

$$R_{min}=V^2/A_r$$

The maximum allowable steer angle ($\phi_{max}$) is then calculated using $R_{min}$ and the stored wheel base and track dimensions. Since $\phi_{max}$ will be reduced as a result of the increased velocity and the full range of operator control input remains the same, the steer ratio, $\theta/\phi_{max}$, will increase.

A preferred embodiment incorporates these capabilities within redundant processors (e.g., 608*a* and 608*b*) and provides a plausibility check internal to the operator control prior to sending the redundant scaled output to the vehicle controller. In the case where steering control may benefit from increasing the steer ratio close in the "drive straight" region of the steering control, the preferred embodiment includes a function that shapes the output using a sinusoidal function. This function enhances the steer ratio close to the center of travel of the input device and reduces the steer ratio close to the ends of travel. This variable steering ratio function is useful for both steering wheel and joystick applications. These features are independent of the type of steering system used in the vehicle. These include, but are not limited to, Ackerman, differential and articulated steering systems. Further, these steering types may include tires, tracks or any other means of guiding a vehicle over the ground or in the water. For incorporation by reference herein in their entirety, see: "The Use of a Steering Function to Improve Human Performance in By-Wire Vehicles" by Susan G. Hill, Jason S. Metcalfe, and Kaleb McDowell as published by the Army Research Laboratory in March 2008 with reference publication number ARL-TR-4387; U.S. Pat. No. 5,884,724 issued to Bohner et al. on Mar. 23, 1999; U.S. Pat. No. 6,625,530 issued to Bolourchi on Sep. 23, 2003; and U.S. PGPUB No. 2004/0064229 to Stout et al. published on Apr. 1, 2004.

Figure 7A:
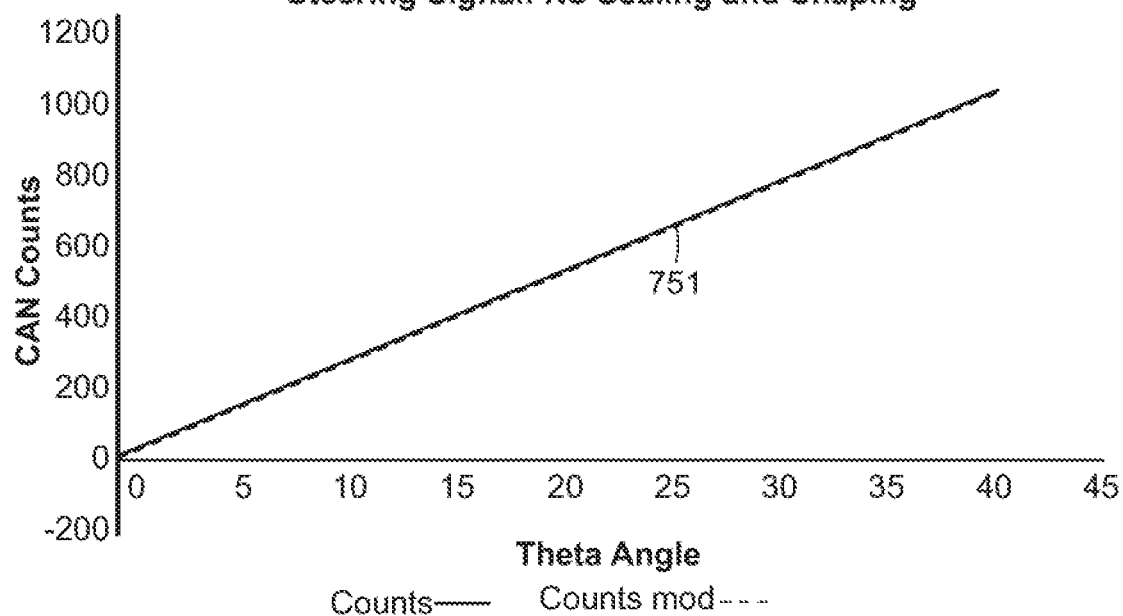
FIG. 7A illustrates a traditional linear relationship for steering signal scaling and shaping.
Figure 7B:
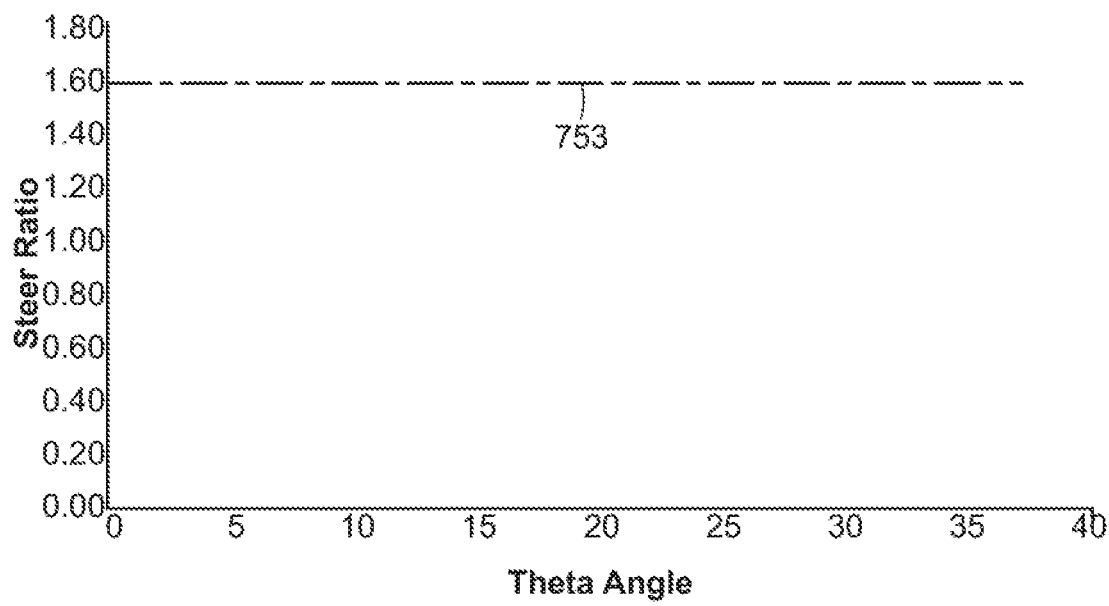
FIG. 7B illustrates a traditional linear relationship for steering ratio.

Referring now to FIGS. 7A-D, several graphs help to illustrate the concepts of the subject disclosure. FIGS. 7A and 7B are traditional linear graphs 750, 752 for steering signal (FIG. 7A) and steering ratio (FIG. 7B), respectively. Each graph 750, 752 has operator control input angle (theta) on the horizontal axis with the steering at center position being a theta angle of 0°. The steering signal graph 750 CAN counts and CAN counts modified on the vertical axis. As can be seen, the graphed line 751 is the same for CAN counts and CAN counts modified because no modification was in place. The graphed line 751 is a linear line.

In FIG. 7B, the steering ratio graph 752 has steer ratio on the vertical axis. Again, the graphed line 753 is linear and also substantially horizontal. Each graphed line 751, 753 being linear is not an ideal performance curve.

Figure 7C:
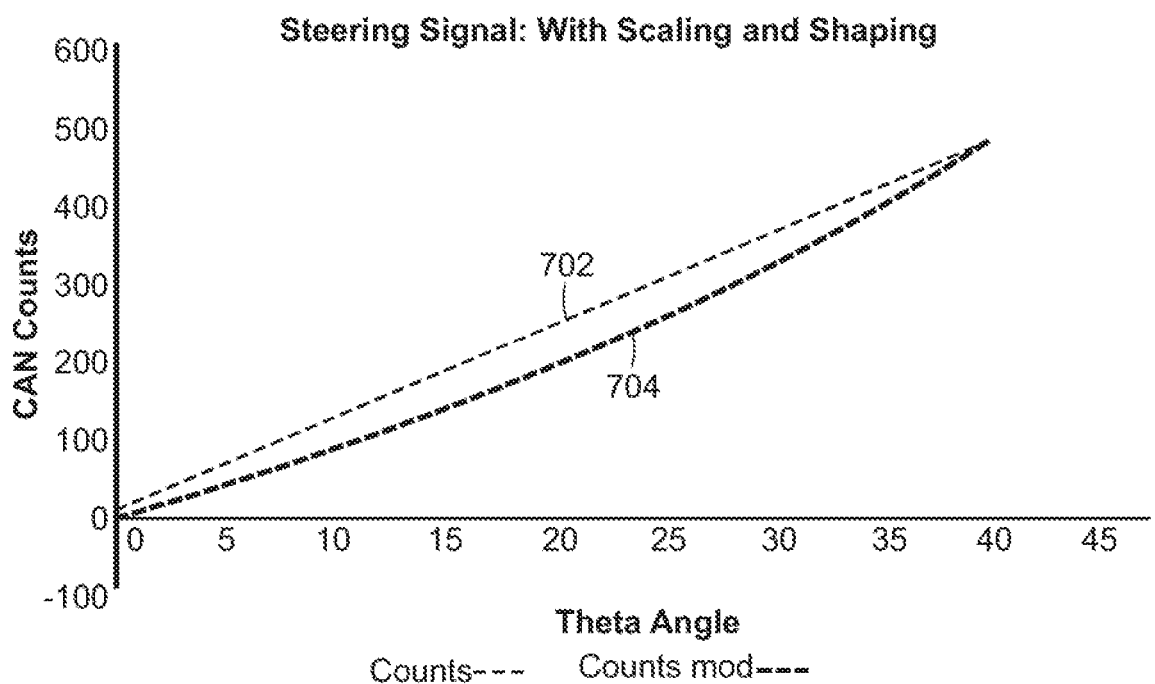
FIG. 7C illustrates the steering signal scaling and shaping performance using the sinusoidal function in accordance with the subject disclosure.
Figure 7D:
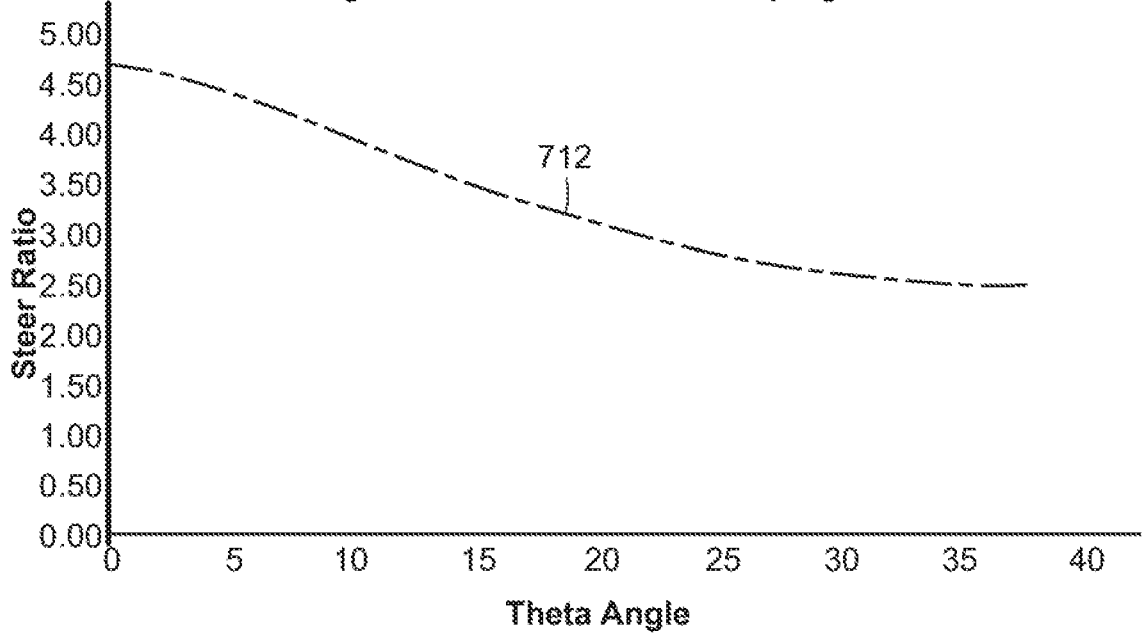
FIG. 7D illustrates the steering ratio performance using the sinusoidal function in accordance with the subject disclosure.

Referring now to FIGS. 7C and 7D, an improved steering signal graph 700 (FIG. 7C) and an improved steering ratio graph 710 (FIG. 7D) are shown. The steering signal graph 700 is improved using scaling and shaping. The steering ratio graph 710 is improved by using a sinusoidal shaping function. The following equation is a representative equation for calculating the CAN counts modified values $$\text{CAN mod} = \text{CAN} - (A*\sin(180*\theta/\theta_{max}))$$

where A is an amplitude modifier, which is selected during vehicle tuning.

Turning to the steering CAN counts line 702, this line is still linear. However, the CAN counts modified line 704 is no longer linear. Scaling and shaping reduces the corresponding CAN counts except near theta angles of zero and forty.

As can be seen in the steering ratio graph 700 of FIG. 7D, the steering ratio line 712 is no longer uniform across the complete range of travel but rather an improved continuously variable shape. The steering ratio line 712 results because the steer ratio is shaped as a sinusoidal function of operator input angle. The use of a sinusoidal curve is improved compared to a traditional polynomial curve because the rate at which the steer ratio is modified is minimized at each end of the curve. A polynomial function would increase the rate of steer ratio change at the end of travel, which is not desirable. Use of a sinusoidal curve is also advantageous compared to piecewise linear approaches by avoiding discontinuities in slope. As a result, the steering ratio line 712 decreases significantly at high theta angles and desirably increases at low theta angles. In one embodiment, the steering ratio is approximately 2.5 at approximately a theta angle of 30° and 6.6 at approximately a theta angle of 5°. Thus, the steering response is dynamically adjusted to improve the driving experience.

Modular System

In addition to the value-added features described above, there is a need for a cost effective, manufacturing friendly, easily configurable module support assembly in a steer by wire system such as the systems described herein. Referring now to FIGS. 8A and 8B, an assembled, cross-sectional view of a steering module support assembly 800, 800' in two different configurations for a steer by wire system in accordance with the subject disclosure is shown. The assemblies 800, 800' is designed for use in a low-torque (3 Nm) configuration. For example, the assembly 800 of FIG. 8A may be configured for use with a joystick, while the assembly 800' of FIG. 8B may be configured for use with a steering wheel with either single or multi-turn capability. Since many of the same parts are utilized, manufacturing efficiency can be accomplished.

As shown in FIGS. 8A and 8B, the assembly 800, 800' includes a steering shaft 812, 812' which is supported by two bearings 820, 820' inside a housing 805, 805'. A distal end 809, 809' of the shaft 812, 812' extends from the housing 805, 805' and containing splines 810, 810' (or slots, threads, and/or other features) for the attachment of a steering handle (not shown), such as a steering wheel or joystick grip. The distal end 809, 809' varies to suit the particular application but the proximal end 811, 811' is substantially identical.

The proximal end 811, 811' of the shaft 812, 812' is disposed inside the housing 805, 805' and contains at least one magnet 830, 830'. The magnet 830, 830' comprises a pole pair (not shown) attached to the shaft 812, 812' and is part of the rotor portion of a BLDC torque motor. A fixed stator 802, 802' surrounds the rotor on the shaft 812, 812'.

In examples, printed circuit boards (not shown) are disposed inside the housing 805, 805' and oriented perpendicular to the shaft 812, 812'. The printed circuit boards may contain at least one magnetic angular position sensor (e.g., Hall effect, AMR or GMR) within the measurable magnetic field of the magnet 830, 830'. The printed circuit boards may also contain electronic hardware and software for the commutation of the BLDC motor. The printed circuit boards and other electronics may be contained within a cover 832, 832' coupled to the proximal end of the stator 802, 802'.

Still referring to FIGS. 8A and 8B, the stator 802, 802' may have an internal stepped portion 803, 803' for receipt of a portion of an end cap 818, 818'. While the end cap 818, 818' substantially encloses the interior of the stator 802, 802', the end cap 818, 818' includes a central hole 819, 819' (FIGS. 8D and 8E) for the shaft 812, 812' to pass therethrough. In the application of FIG. 8B, a length of the end cap 818' is selected to be greater than a length of the end cap 818. Detailed illustrations of the housing 805, 805' the end cap 818, 818' and the cover 832, 832' are shown in FIGS. 8C-F, respectively.

As shown in FIG. 8B, modules can optionally be added to the assembly 800, 800' by extending the shaft 812' and the end cap 818'. Such modules can include a magnetic brake to supplement motor torque for applications requiring virtual end of travel stops or a mechanism (such as the disk 502 of FIGS. 5A and 5B) for mechanical end of travel stops.

The modules can be scaled to suit the torque requirements of the joystick or steering wheel systems. The modules can also include software for controlling motor and/or brake torque to tailor the "connected feel" of the system, including the amount of return-to-center steering torque and countertorque as a function of operator steering angle input rate of change. The software can also be configured for transforming operator input steering angle to output commands for vehicle steering mechanism angle to tailor the vehicle steering response, including adjusting steer ratio as a function of vehicle velocity and operator steering angle input, and adjusting maximum vehicle steering mechanism response as a function of vehicle velocity and maximum allowable vehicle radial acceleration. Communication of signals into, out of, and within the assembly 800, 800' may be analog, PWM, or digital (including CAN, single edge nibble transmission (SENT), or other protocols).

Referring now to FIGS. 9A and 9B, an assembled, cross-sectional view of an alternative steer by wire device 900, 900' in accordance with the subject disclosure is shown. The device 900, 900' is designed for use in a high-torque (5 Nm) configuration. For example, the device 900 of FIG. 9A may be configured for use with a standard steering wheel with single or multi-turn capability, while the device 900' of FIG. 9B may be configured for use with a steering wheel with a power off brake.

As shown in FIGS. 9A and 9B, the device 900, 900' includes a steering shaft 912, 912' which is supported by two bearings 920, 920' inside a housing 905, 905'. A distal end 909, 909' of the shaft 912, 912' extends from the housing 905, 905' and containing splines 910, 910' (or slots, threads, and/or other features) for the attachment of a steering handle (not shown), such as a steering wheel or joystick grip. A proximal end 911, 911' of the shaft 912, 912' disposed inside the housing 905, 905' contains a magnet 930, 930'. The magnet 930, 930' comprises a magnetic pole pair (not shown) attached to the shaft 912, 912' and is a part of the rotor portion of a BLDC torque motor. A stator 902, 902' surrounds the rotor on the shaft 912, 912'.

In examples, printed circuit boards (not shown) are disposed inside the housing 905, 905' oriented perpendicular to the shaft 912, 912'. The printed circuit boards may contain at least one magnetic angular position sensor within the measurable magnetic field of the magnet 930, 930'. The printed circuit boards may also contain electronic hardware and software for the commutation of the BLDC motor. The printed circuit boards and other electronics may be contained within a cover 932, 932' coupled to the proximal end of the stator 902, 902'.

Still referring to FIGS. 9A and 9B, the stator 902, 902' may have an internal stepped portion 903, 903' for receipt of a portion of an end cap 918, 918'. While the end cap 918, 918' substantially encloses the interior of the stator 902, 902', the end cap 918, 918' includes a central hole 919, 919' (FIG. 9C) for the shaft 912, 912' to pass therethrough. As shown in FIG. 9B, modules can optionally be added to the device 900, 900' by using a housing extender 940 to extending the shaft 912' and the end cap 918'. Such modules can include a torque assembly 1000 (described in more detail below) for providing stopping torque to the shaft 912' during power-off. Detailed illustrations of the end cap 918, 918', the housing 905, 905' and the housing extender 940 are shown in FIGS. 9C-E, respectively.

It is envisioned that the assemblies 800, 800', 900, 900' are formed as kits. A kit may contain a plurality of components that are different and interchangeable to adapt the configuration of the assemblies 800, 800', 900, 900' to different applications as shown above. For example, a plurality of shafts, a plurality of end caps, and a plurality of modules may form matched sets. In other words, upon selection of a desired module or modules (e.g., a power off brake and/or end of travel stop), the proper shaft and end cap are selected along with any other necessary components to assemble these components with the housing, magnets, printed circuit boards, stators and other components. Thus, the assemblies 800, 800', 900, 900' are modular and may take many other arrangements than those shown herein.

Torque in the Off Position

In addition to a module support assembly, there is a need for a reliable, fail-safe mechanism to supply torque to hold the steering wheel of a steer by wire system in position when vehicle power is switched off. This mechanism will be useful for both steering wheel and joystick applications. This feature is independent of the type of steering system used in the vehicle. These include, but are not limited to, Ackerman, differential and articulated steering systems. Further, these steering types may include tires, tracks or any other means of guiding a vehicle over the ground or in the water.

Referring now to FIGS. 10A and 10B, an exploded view and an assembled, cross-sectional view, respectively, of a steering assembly 1000 having a power off brake mechanism for a steer by wire system in accordance with the subject disclosure is shown. The steering assembly 1000 is adapted to create resistive torque at the operator steering wheel when the vehicle is switched off. As shown in FIGS. 10A and 10B, the components of the steering assembly 1000 are adapted to be housed within a cylindrical housing 1002 and configured such that a distal end 1003 of the steering shaft 1012 of the steer by wire system extends from the housing 1002. The distal end 1003 is threaded to couple to a steering wheel and the like. The shaft 1012 extends along and rotates about an axis A. The assembly 1000 includes two bearings 1020 to allow rotation of the shaft 1012 while still supporting the shaft 1012.

The housing 1002 also includes a flat outer circumference portion 1052 that defines an opening 1054. An open distal end 1005 of the housing 1002 is adapted for receipt of a protective end plate 1018. Preferably, the protective end plate 1018 is bolted in place by fasteners 1007. The end plate 1018 substantially encloses the interior 1007 of the housing 1002 but does include a central hole 1019 for the shaft 1012 to pass therethrough. The proximal bearing 1020 is supported in the housing 1002 and the distal bearing 1020 is supported in the end plate 1018. A flex washer 1024 is used to help retain one or both of the bearing 1020 in place.

The steering assembly 1000 also includes opposing friction plates 1004, 1006 having circumferential bevel gear portions 1008, 1010. Each friction plate 1004, 1006 has a central opening 1009, 1011 that the shaft 1012 extends through. The proximal friction plate 1004 is fixed to the shaft 1012 by a pin 1013. Thus, the proximal friction plate 1004 rotates with the shaft 1012. The shaft 1012 defines an annular groove 1056 that receives washers 1022. The washers 1022 provide additional support for the proximal friction plate 1004 to prevent the proximal friction plate 1004 from sliding proximally on the shaft 1012.

The second distal friction plate 1006 is coaxial with the shaft 1012 but can rotate freely around the shaft 1012. A buffer disk 1058 mounts between the opposing friction plates 1004, 1006. A biasing assembly 1014 applies a force to push the distal friction plate 1006 towards the proximal friction plate 1004. The buffer disk 1058 maintains separation between plates 1004, 1006 but the force of the biasing assembly 1014 is sufficient so that as the buffer disk 1059 is squeezed between the plate 1004, 1006, the plates 1004, 1006 become linked together. Thus, in normal operation, the plates 1004, 1006 both rotate with the shaft 1012.

The biasing assembly 1014 includes a pressure ferrule 1060 and pressure ring 1062 that insert into the central opening 1011 through a spring guide collar 1064 extending distally on the friction plate 1006. Two nuts 1068 mount on a threaded shoulder 1066 of the shaft 1012. A spring 1070 extends between the nuts 1068 and pressure ring 1062 to supply the force for squeezing the friction plates 1004, 1006 together. This compressive force may be adjusted by varying the location on the threaded shoulder 1066 that the nuts 1068 are fixed, by selection of the strength of the spring 1070, by selection of the material of the various components and the like. The nuts 1058 may be accessed for adjustment via holes 1050a, 1050b in the housing 1002.

Still referring to FIGS. 10A and 10B, the steering assembly 1000 also includes a power off brake mechanism 1080. The power off brake mechanism 1080 mounts in the opening 1054 to selectively insert a pinion gear 1082 between the opposing gears 1008, 1010 when the vehicle is shut off as shown in FIG. 10B. When the pinion gear 1082 is inserted and engaging the friction plates 1004, 1006, the friction plates 1004, 1006 rotate in opposite directions. The frictional torque created by the counter-rotation of the friction plates 1004, 1006 opposes rotation of the shaft 1012 in either direction (e.g., a power off braking effect). The amount of frictional torque can be tuned with the selection of material of the friction plates 1004, 1006, and force applied by the biasing assembly 1014 (e.g., spring selection, size and shape of the components etc.). As would be appreciated, the steering assembly 1000 functions as a fail-safe because the maximum locking torque can be designed to be below the allowable threshold for steering the vehicle. Thus, under no power conditions, the steering would feel "heavy" but would not be fully locked so that vehicle control could be maintained.

The power off brake mechanism 1080 also includes a mounting block 1084 fixed to the housing 1002 by fasteners 1086. The pinion gear 1082 slides in a guide sleeve 1088 mounted in a hole 1090 formed in the mounting block 1084 as shown by arrow B in FIG. 10B. A spring 1091 mounts in a cap/solenoid assembly 1093 to apply downward force to the pinion gear 1082. Thus, with no power applied, the pinion gear 1082 is forced into engagement between the friction plates 1004, 1006 with the force from the spring 1070 coupling the plates 1004, 1006 together about the pinion gear 1082. The bevel of the gears 1008, 1010 and wedge shape of the toothed end 1092 of the pinion gear 1082 help with the insertion.

When power is applied to the power off brake mechanism 1080, a solenoid (not shown) is energized to retract the pinion gear 1082. Thus, during normal driving conditions, the power off brake mechanism 1080 does not interfere with both plates 1004, 1006 rotating with the shaft 1012.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, electronics, sleeves, ferrules, disks and the like) shown as distinct for purposes of illustration may be incorporated within other functional elements in a particular implementation.

All patents, patent applications and other references disclosed herein are hereby expressly incorporated in their entireties by reference. While the subject technology has been described with respect to preferred embodiments, those skilled in the art will readily appreciate that various changes and/or modifications can be made to the subject technology without departing from the spirit or scope of the invention as defined by the appended claims. For example, each claim may depend from any or all claims in a multiple dependent manner even though such has not been originally claimed.

What is claimed is:

1. A brushless DC motor for providing active torque feedback in a steer by wire system comprising:
    a fixed stator;
    a rotor mounted for rotation with respect to the fixed stator;
    a plurality of magnets mounted to the rotor, each magnet forming a pole pair;
    at least two analog magnetic sensors for providing a continuous angle measurement signal; and
    a steering control unit for receiving the continuous angle measurement signal and determining a relative positional measurement of the rotor based on the continuous angle measurement signal, wherein the steering control unit shapes a steering ratio line as a continuously variable shaped line using a sinusoidal curve of an operator input angle where a steering ratio decreases at a first operator input angle and increases at a second operator input angle and wherein the first operator input angle is higher than the second operator input angle.

2. A brushless DC motor as recited in claim 1, wherein the steering control unit determines an absolute measurement of a position of the rotor upon start up and updates the position of the rotor based on the relative positional measurement.

3. A brushless DC motor as recited in claim 2, wherein the steering control unit utilizes a single magnet at an end of a shaft of the rotor for sensing the position.

4. A brushless DC motor as recited in claim 1, wherein the at least two analog magnetic sensors provide motor commutation data to the steering control unit so that a phase relationship between the fixed stator and the rotor is determined by the steering control unit.

5. A brushless DC motor as recited in claim 1, wherein the plurality of magnets is twenty-four magnets and the at least two analog magnetic sensors is three analog magnetic sensors 120 electrical degrees out of phase with each other so that the resulting continuous angle measurement signal is a substantially sawtooth waveform resulting in about 589,824 counts/revolution of the rotor.

\* \* \* \* \*